(12) United States Patent
Perlman

(10) Patent No.: US 10,984,403 B2
(45) Date of Patent: Apr. 20, 2021

(54) SYSTEMS AND METHODS FOR BROKERED AUTHENTIFICATION EXPRESS SELLER LINKS

(71) Applicant: Visa International Service Association, San Francisco, CA (US)

(72) Inventor: Jeffrey William Perlman, Gordon (AU)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 224 days.

(21) Appl. No.: 16/057,467

(22) Filed: Aug. 7, 2018

(65) Prior Publication Data

US 2019/0108505 A1 Apr. 11, 2019

Related U.S. Application Data

(63) Continuation of application No. 12/778,468, filed on May 12, 2010, now Pat. No. 10,068,220, which is a (Continued)

(51) Int. Cl.
*G06Q 20/22* (2012.01)
*G06Q 20/04* (2012.01)
(Continued)

(52) U.S. Cl.
CPC .............. *G06Q 20/29* (2013.01); *G06Q 20/04* (2013.01); *G06Q 20/123* (2013.01); *G06Q 20/40* (2013.01);
(Continued)

(58) Field of Classification Search
CPC ...... G06Q 20/29; G06Q 20/04; G06Q 20/123; G06Q 20/40
(Continued)

(56) References Cited

U.S. PATENT DOCUMENTS

| 3,652,795 A | 3/1972 | Wolf |
| 4,321,672 A | 3/1982 | Braun |

(Continued)

FOREIGN PATENT DOCUMENTS

| AU | 640855 B2 | 9/1993 |
| CN | 1313973 | 9/2001 |

(Continued)

OTHER PUBLICATIONS

Office Action dated Nov. 30, 2013 in related/corresponding Korean Patent Application No. 10-2009-7007478, entitled, "Method and System for Processing Micropayment Transactions." (P-19600KR) (9 pages).

(Continued)

*Primary Examiner* — Samica L Norman
*Assistant Examiner* — Murali K Dega
(74) *Attorney, Agent, or Firm* — Loeb & Loeb LLP

(57) ABSTRACT

Systems and methods for providing a transaction authorization from a funds facilitation system for a transaction requested by a user to a merchant system such that the user is not required to input any user authentication information in excess of authentication information required by the merchant system are provided. A system and method can include receiving a transaction request from the merchant system containing a merchant ID, a merchant user ID, and a transaction amount. The system identifies a funds facilitation system user ID based on the merchant ID and the merchant user ID and determines satisfaction of a funds facilitation system user authentication requirement based on the merchant system having a trusted status with the funds facilitation system. A transaction authorization message or transaction denial message is provided to the merchant system based on account information associated with the user and the transaction amount.

18 Claims, 20 Drawing Sheets

Related U.S. Application Data continuation-in-part of application No. 11/870,799, filed on Oct. 11, 2007, now Pat. No. 8,335,745.

(60) Provisional application No. 60/829,057, filed on Oct. 11, 2006, provisional application No. 61/256,095, filed on Oct. 29, 2009.

(51) Int. Cl.
 *G06Q 20/12* (2012.01)
 *G06Q 20/40* (2012.01)
 *G06Q 30/06* (2012.01)
 *G07F 7/08* (2006.01)

(52) U.S. Cl.
 CPC ......... *G06Q 20/401* (2013.01); *G06Q 20/403* (2013.01); *G06Q 20/4037* (2013.01); *G06Q 30/06* (2013.01); *G07F 7/08* (2013.01)

(58) Field of Classification Search
 USPC ..................................................... 705/65, 75
 See application file for complete search history.

(56) References Cited

U.S. PATENT DOCUMENTS

| | | | |
|---|---|---|---|
| 4,341,951 | A | 7/1982 | Benton |
| 4,454,414 | A | 6/1984 | Benton |
| 4,645,873 | A | 2/1987 | Chomet |
| 4,713,761 | A | 12/1987 | Sharpe |
| 4,750,119 | A | 6/1988 | Cohen |
| 4,823,264 | A | 4/1989 | Deming |
| RE32,985 | E | 7/1989 | Nagata |
| 4,866,611 | A | 9/1989 | Cree |
| 4,941,090 | A | 7/1990 | McCarthy |
| 5,010,485 | A | 4/1991 | Bigari |
| 5,025,372 | A | 6/1991 | Burton |
| 5,132,521 | A | 7/1992 | Smith |
| 5,220,501 | A | 6/1993 | Lawlor |
| 5,231,571 | A | 7/1993 | D |
| 5,326,960 | A | 7/1994 | Tannenbaum |
| 5,329,589 | A | 7/1994 | Fraser |
| 5,350,906 | A | 9/1994 | Brody |
| 5,351,296 | A | 9/1994 | Sullivan |
| 5,383,113 | A | 1/1995 | Kight |
| 5,412,730 | A | 5/1995 | Jones |
| 5,440,634 | A | 8/1995 | Jones |
| 5,450,537 | A | 9/1995 | Hirai |
| 5,453,601 | A | 9/1995 | Rosen |
| 5,455,407 | A | 10/1995 | Rosen |
| 5,537,314 | A | 7/1996 | Kanter |
| 5,557,516 | A | 9/1996 | Hogan |
| 5,581,764 | A | 12/1996 | Fitzgerald |
| 5,623,547 | A | 4/1997 | Jones |
| 5,640,577 | A | 6/1997 | Scharmer |
| 5,659,165 | A | 8/1997 | Jennings |
| 5,692,132 | A | 11/1997 | Hogan |
| 5,699,528 | A | 12/1997 | Hogan |
| 1,792,889 | A | 2/1998 | Tozzoli |
| 5,717,989 | A | 2/1998 | Tozzoli |
| 5,742,845 | A | 4/1998 | Wagner |
| 5,745,574 | A | 4/1998 | Muftic |
| 5,790,790 | A | 8/1998 | Smith |
| 5,793,302 | A | 8/1998 | Stambler |
| 5,794,259 | A | 8/1998 | Kikinis |
| 5,799,087 | A | 8/1998 | Rosen |
| 5,815,657 | A | 9/1998 | Williams |
| 5,832,463 | A | 11/1998 | Funk |
| 5,850,442 | A | 12/1998 | Muftic |
| 5,862,325 | A | 1/1999 | Reed |
| 5,873,072 | A | 2/1999 | Kight |
| 5,884,288 | A | 3/1999 | Chang |
| 5,884,312 | A | 3/1999 | Dustan |
| 5,890,140 | A | 3/1999 | Clark |
| 5,893,120 | A | 4/1999 | Nemes |
| 5,903,881 | A | 5/1999 | Schrader |
| 5,920,629 | A | 7/1999 | Rosen |
| 5,946,667 | A | 8/1999 | Tull |
| 5,953,423 | A | 9/1999 | Rosen |
| 5,956,391 | A | 9/1999 | Melen |
| 5,956,700 | A | 9/1999 | Landry |
| 5,960,411 | A | 9/1999 | Hartman |
| 5,963,647 | A | 10/1999 | Downing |
| 5,966,696 | A | 10/1999 | Giraud |
| 5,966,698 | A | 10/1999 | Pollin |
| 5,974,148 | A | 10/1999 | Stambler |
| 5,974,430 | A | 10/1999 | Mutschler |
| 6,012,041 | A | 1/2000 | Brewer |
| 6,012,044 | A | 1/2000 | Maggioncalda |
| 6,012,045 | A | 1/2000 | Barzilai |
| 6,012,048 | A | 1/2000 | Gustin |
| 6,029,150 | A | 2/2000 | Kravitz |
| 6,032,133 | A | 2/2000 | Hilt |
| 6,067,621 | A | 5/2000 | Yu |
| 6,088,717 | A | 7/2000 | Reed |
| 6,092,053 | A | 7/2000 | Boesch |
| 6,105,865 | A * | 8/2000 | Hardesty ................ G06Q 20/04 235/380 |
| 6,138,107 | A | 10/2000 | Elgamal |
| 6,173,272 | B1 | 1/2001 | Thomas |
| 6,192,407 | B1 | 2/2001 | Smith |
| 6,226,624 | B1 | 5/2001 | Watson |
| 6,227,447 | B1 | 5/2001 | Campisano |
| 6,289,322 | B1 | 9/2001 | Kitchen |
| 6,317,729 | B1 * | 11/2001 | Camp .................. G06Q 20/027 705/16 |
| 6,327,578 | B1 | 12/2001 | Linehan |
| 6,330,550 | B1 | 12/2001 | Brisebois |
| 6,332,134 | B1 | 12/2001 | Foster |
| 6,341,724 | B2 | 1/2002 | Campisano |
| 6,351,739 | B1 | 2/2002 | Egendorf |
| 6,360,205 | B1 | 3/2002 | Iyengar |
| 6,421,729 | B1 | 7/2002 | Paltenghe |
| 6,424,249 | B1 | 7/2002 | Houvener |
| 6,467,684 | B2 | 10/2002 | Fite |
| 6,487,599 | B1 | 11/2002 | Smith |
| 6,490,601 | B1 | 12/2002 | Markus |
| 6,499,042 | B1 | 12/2002 | Markus |
| 6,547,129 | B2 | 4/2003 | Nichols |
| 6,609,113 | B1 | 8/2003 | Oleary |
| 6,748,367 | B1 | 6/2004 | Lee |
| 6,757,710 | B2 | 6/2004 | Reed |
| 6,850,996 | B2 | 2/2005 | Wagner |
| 6,871,288 | B2 | 3/2005 | Russikoff |
| 6,873,974 | B1 | 3/2005 | Schutzer |
| 6,907,476 | B2 | 6/2005 | Wagner |
| 6,915,271 | B1 | 7/2005 | Meyer |
| 6,932,268 | B1 | 8/2005 | McCoy |
| 6,963,843 | B1 | 11/2005 | Takatsu |
| 7,006,993 | B1 | 2/2006 | Cheong |
| 7,062,706 | B2 | 6/2006 | Maxwell |
| 7,089,208 | B1 | 8/2006 | Levchin |
| 7,092,913 | B2 | 8/2006 | Cannon, Jr. |
| 7,099,850 | B1 | 8/2006 | Mann |
| 7,103,571 | B2 | 9/2006 | Shigemi |
| 7,127,427 | B1 | 10/2006 | Casper |
| 7,159,180 | B2 | 1/2007 | Ward |
| 7,175,074 | B2 | 2/2007 | Mejias |
| 7,177,838 | B1 | 2/2007 | Ling |
| 7,216,292 | B1 | 5/2007 | Snapper |
| 7,231,372 | B1 | 6/2007 | Prange |
| 7,249,097 | B2 | 7/2007 | Hutchison |
| 7,249,099 | B2 | 7/2007 | Ling |
| 7,251,656 | B2 | 7/2007 | Keown |
| 7,254,569 | B2 | 8/2007 | Goodman |
| 7,257,581 | B1 | 8/2007 | Steele |
| 7,260,724 | B1 | 8/2007 | Dickinson |
| 7,324,972 | B1 | 1/2008 | Oliver |
| 7,328,189 | B2 | 2/2008 | Ling |
| 7,334,184 | B1 | 2/2008 | Simons |
| 7,337,144 | B1 | 2/2008 | Blinn |
| 7,337,953 | B2 | 3/2008 | Sgambati |
| 7,343,351 | B1 | 3/2008 | Bishop |
| 7,346,577 | B1 | 3/2008 | Williams |

(56) References Cited

U.S. PATENT DOCUMENTS

| | | | |
|---|---|---|---|
| 7,346,587 B2 | 3/2008 | Goldstein | |
| 7,347,361 B2 | 3/2008 | Lovett | |
| 7,350,139 B1 | 3/2008 | Simons | |
| RE40,220 E | 4/2008 | Nichols | |
| 7,366,702 B2 | 4/2008 | David | |
| 7,366,703 B2 | 4/2008 | Gray | |
| 7,376,621 B1 | 5/2008 | Ling | |
| 7,379,919 B2 | 5/2008 | Hogan | |
| 7,392,536 B2 | 6/2008 | Jamieson | |
| 7,395,241 B1 | 7/2008 | Cook | |
| 7,412,420 B2 | 8/2008 | Holdsworth | |
| 7,415,443 B2 | 8/2008 | Hobson | |
| 7,426,530 B1 | 9/2008 | Rosko | |
| 7,437,327 B2 | 10/2008 | Lam | |
| 7,437,757 B2 | 10/2008 | Holdsworth | |
| 7,444,672 B2 | 10/2008 | Ellmore | |
| 7,447,662 B2 | 11/2008 | Gibson | |
| 7,454,376 B1 | 11/2008 | Argenbright | |
| 7,458,507 B2 | 12/2008 | Fillinger | |
| 7,461,028 B2 | 12/2008 | Wronski | |
| 7,461,265 B2 | 12/2008 | Ellmore | |
| 7,461,776 B2 | 12/2008 | Steiger | |
| 7,463,946 B2 | 12/2008 | Smith | |
| 7,471,818 B1 | 12/2008 | Price | |
| 7,472,171 B2 | 12/2008 | Miller | |
| 7,483,845 B2 | 1/2009 | Vetelainen | |
| 7,487,127 B2 | 2/2009 | Weichert | |
| 7,496,952 B2 | 2/2009 | Edwards | |
| 7,500,606 B2 | 3/2009 | Park | |
| 7,502,833 B2 | 3/2009 | Schaeck | |
| 7,512,552 B2 | 3/2009 | Karas | |
| 7,519,560 B2 | 4/2009 | Lam | |
| 7,523,182 B2 | 4/2009 | Godwin | |
| 7,533,063 B2 | 5/2009 | Kianian | |
| 7,533,064 B1 | 5/2009 | Boesch | |
| 7,533,828 B2 | 5/2009 | Ong | |
| 7,536,354 B1 | 5/2009 | Degroeve | |
| 7,540,408 B2 | 6/2009 | Levine | |
| 7,543,738 B1 | 6/2009 | Saunders | |
| 7,546,272 B2 | 6/2009 | Loy | |
| 7,546,275 B1 | 6/2009 | Herzberg | |
| 7,548,988 B2 | 6/2009 | Philyaw | |
| 7,552,467 B2 | 6/2009 | Lindsay | |
| 7,568,631 B2 | 8/2009 | Gibbs | |
| 7,571,140 B2 | 8/2009 | Weichert | |
| 7,577,599 B2 | 8/2009 | Sanchez | |
| 7,580,857 B2 | 8/2009 | Vanfleet | |
| 7,580,898 B2 | 8/2009 | Brown | |
| 7,581,257 B1 | 8/2009 | Ohara | |
| 7,584,153 B2 | 9/2009 | Brown | |
| 7,590,595 B2 | 9/2009 | Pessin | |
| 7,606,760 B2 | 10/2009 | Hutchison | |
| 7,610,233 B1 | 10/2009 | Leong | |
| 7,627,523 B1 | 12/2009 | Symonds | |
| 7,627,531 B2 | 12/2009 | Breck | |
| 7,657,531 B2 | 2/2010 | Bisbee | |
| 7,660,779 B2 | 2/2010 | Goodman | |
| 7,664,699 B1 | 2/2010 | Powell | |
| 7,680,679 B1 | 3/2010 | Patricelli | |
| 7,694,135 B2 | 4/2010 | Rowan | |
| 7,698,221 B2 | 4/2010 | Blinn | |
| 7,702,580 B1 | 4/2010 | Voth | |
| 7,707,105 B2 | 4/2010 | Oneil | |
| 7,711,621 B2 | 5/2010 | Huang | |
| 7,716,596 B2 | 5/2010 | Cao | |
| 7,729,925 B2 | 6/2010 | Maritzen | |
| 7,761,374 B2 | 7/2010 | Sahota | |
| 8,402,555 B2 | 3/2013 | Grecia | |
| 8,533,860 B1 | 9/2013 | Grecia | |
| 8,887,308 B2 | 11/2014 | Grecia | |
| 10,068,220 B2* | 9/2018 | Perlman | G06Q 20/04 |
| 2001/0014878 A1* | 8/2001 | Mitra | G06Q 30/0601 |
| | | | 705/39 |
| 2001/0032182 A1 | 10/2001 | Kumar | |
| 2001/0039535 A1 | 11/2001 | Tsiounis | |
| 2001/0054148 A1 | 12/2001 | Hoornaert | |
| 2001/0056405 A1 | 12/2001 | Muyres | |
| 2002/0002495 A1 | 1/2002 | Ullman | |
| 2002/0004772 A1 | 1/2002 | Templeton | |
| 2002/0016769 A1 | 2/2002 | Barbara | |
| 2002/0046341 A1 | 4/2002 | Kazaks | |
| 2002/0052841 A1 | 5/2002 | Guthrie | |
| 2002/0059141 A1 | 5/2002 | Davies | |
| 2002/0073027 A1 | 6/2002 | Hui | |
| 2002/0083011 A1 | 6/2002 | Kobayashi | |
| 2002/0120582 A1 | 8/2002 | Elston | |
| 2002/0184147 A1 | 12/2002 | Boulger | |
| 2003/0014633 A1 | 1/2003 | Gruber | |
| 2003/0061111 A1 | 3/2003 | Dutta | |
| 2003/0074328 A1 | 4/2003 | Schiff | |
| 2003/0097331 A1 | 5/2003 | Cohen | |
| 2003/0101134 A1 | 5/2003 | Liu | |
| 2003/0101137 A1 | 5/2003 | Wronski | |
| 2003/0110136 A1 | 6/2003 | Wells | |
| 2003/0135434 A1 | 7/2003 | Jain | |
| 2003/0183689 A1 | 10/2003 | Swift | |
| 2003/0197061 A1 | 10/2003 | Din | |
| 2003/0212642 A1 | 11/2003 | Weller | |
| 2003/0233334 A1 | 12/2003 | Smith | |
| 2004/0029569 A1 | 2/2004 | Khan | |
| 2004/0039694 A1 | 2/2004 | Dunn | |
| 2004/0044621 A1 | 3/2004 | Huang | |
| 2004/0093303 A1 | 5/2004 | Picciallo | |
| 2004/0103057 A1 | 5/2004 | Melbert | |
| 2004/0118914 A1 | 6/2004 | Smith | |
| 2004/0122770 A1 | 6/2004 | Craig | |
| 2004/0128508 A1 | 7/2004 | Wheeler | |
| 2004/0236692 A1 | 11/2004 | Sellen | |
| 2005/0005094 A1 | 1/2005 | Jamieson | |
| 2005/0086169 A1 | 4/2005 | Wells | |
| 2005/0097049 A1 | 5/2005 | Writer | |
| 2005/0131816 A1 | 6/2005 | Britto | |
| 2005/0147225 A1 | 7/2005 | Mallick | |
| 2005/0149455 A1 | 7/2005 | Bruesewitz | |
| 2005/0149457 A1* | 7/2005 | Cihula | G07F 7/08 |
| | | | 705/65 |
| 2005/0192896 A1* | 9/2005 | Hutchison | G06Q 20/401 |
| | | | 705/40 |
| 2005/0192899 A1 | 9/2005 | Reardon | |
| 2005/0199709 A1 | 9/2005 | Linlor | |
| 2005/0211763 A1 | 9/2005 | Sgambati | |
| 2005/0246293 A1* | 11/2005 | Ong | G06Q 30/06 |
| | | | 705/70 |
| 2005/0278544 A1* | 12/2005 | Baxter | G06F 21/79 |
| | | | 713/182 |
| 2006/0080238 A1 | 4/2006 | Nielsen | |
| 2006/0089906 A1 | 4/2006 | Rowley | |
| 2006/0131390 A1 | 6/2006 | Kim | |
| 2006/0143122 A1 | 6/2006 | Sines | |
| 2006/0143690 A1 | 6/2006 | Lin | |
| 2006/0149671 A1 | 7/2006 | Nix | |
| 2006/0190300 A1 | 8/2006 | Drucker | |
| 2006/0230265 A1 | 10/2006 | Krishna | |
| 2006/0235777 A1 | 10/2006 | Takata | |
| 2006/0294005 A1 | 12/2006 | Drepak | |
| 2007/0011093 A1 | 1/2007 | Tree | |
| 2007/0136211 A1 | 6/2007 | Brown | |
| 2007/0198432 A1 | 8/2007 | Pitroda | |
| 2007/0214259 A1 | 9/2007 | Ahmed | |
| 2007/0255662 A1 | 11/2007 | Tumminaro | |
| 2007/0260536 A1 | 11/2007 | Stone | |
| 2007/0276944 A1 | 11/2007 | Samovar | |
| 2007/0288323 A1* | 12/2007 | Halevy | G06Q 20/12 |
| | | | 705/50 |
| 2007/0291741 A1 | 12/2007 | Hwang | |
| 2008/0015985 A1 | 1/2008 | Abhari | |
| 2008/0091600 A1 | 4/2008 | Egnatios | |
| 2008/0091619 A1 | 4/2008 | Perlman | |
| 2008/0110983 A1 | 5/2008 | Ashfield | |
| 2008/0162295 A1 | 7/2008 | Bedier | |
| 2008/0177796 A1 | 7/2008 | Eldering | |
| 2008/0201769 A1 | 8/2008 | Finn | |
| 2008/0208762 A1 | 8/2008 | Arthur | |
| 2008/0228653 A1 | 9/2008 | Holdsworth | |

(56) References Cited

U.S. PATENT DOCUMENTS

| | | | |
|---|---|---|---|
| 2008/0243666 A1* | 10/2008 | Rowan | G06Q 30/08 705/37 |
| 2008/0255991 A1* | 10/2008 | Wang | G06Q 20/40 705/42 |
| 2008/0288405 A1 | 11/2008 | John | |
| 2008/0289022 A1 | 11/2008 | Chiu | |
| 2008/0306877 A1 | 12/2008 | Mandeles | |
| 2009/0006646 A1 | 1/2009 | Duarte | |
| 2009/0063345 A1 | 3/2009 | Erikson | |
| 2009/0094148 A1 | 4/2009 | Gilder | |
| 2009/0121016 A1 | 5/2009 | Hammad | |
| 2009/0150265 A1 | 6/2009 | Keld | |
| 2009/0157531 A1 | 6/2009 | Bui | |
| 2009/0171778 A1 | 7/2009 | Powell | |
| 2009/0171844 A1 | 7/2009 | Olliphant | |
| 2009/0173782 A1 | 7/2009 | Muscato | |
| 2009/0182674 A1 | 7/2009 | Patel | |
| 2009/0182675 A1 | 7/2009 | Brody | |
| 2009/0210347 A1 | 8/2009 | Sarcanin | |
| 2009/0216676 A1 | 8/2009 | Mathur | |
| 2009/0259547 A1 | 10/2009 | Clopp | |
| 2009/0292642 A1* | 11/2009 | Han | G06Q 30/04 705/71 |
| 2010/0318801 A1 | 12/2010 | Roberge | |
| 2015/0170113 A1* | 6/2015 | Grote | G06Q 20/0855 705/39 |

FOREIGN PATENT DOCUMENTS

| | | | |
|---|---|---|---|
| JP | H07064911 A | 3/1995 | |
| JP | 2000259705 A | 9/2000 | |
| JP | 200299852 A | 4/2002 | |
| JP | 2002525766 A | 8/2002 | |
| JP | 2004537088 A | 12/2004 | |
| JP | 2006236045 A | 9/2006 | |
| TW | 482988 B | 4/2002 | |
| TW | 200410157 | 6/2004 | |
| TW | 200531498 | 9/2005 | |
| WO | 9613814 A1 | 5/1996 | |
| WO | 0205224 A2 | 1/2002 | |
| WO | 02079922 A2 | 10/2002 | |

OTHER PUBLICATIONS

Examination Report dated Sep. 23, 2013 in related/corresponding Taiwanese Patent Application No. 96137958 (P-19600TW). (14 pages).

Decision on Rejection dated Jun. 9, 2013 in the related/corresponding Chinese Patent Appl. No. 200780045340.4, entitled, "Method and System for Processing Micropayment Transactions," (13 pages).

Office Action dated Jun. 11, 2013 in the related/corresponding Japanese Patent Appl. No. 2012-532582, entitled, "Method and System for Processing Micropayment Transactions," (9 pages).

White, Ron, "How Computers Work", Millennium Ed., Que Corporation, Indianapolis, IN, 1999. (284 pages).

European Patent Office, Extended European Search Report, dated May 4, 2011, for Application No. 07853964.0 (4 pages).

Ramachandran, Mani, Jul. 13, 2010 Office Action from Australian Patent Application No. 2007307688 [2 pp.].

International Search Report of PCT Application No. PCT/US2001/021725, dated Aug. 29, 2002, 2 pages.

International Search Report for PCT/US07/81124, dated Sep. 5, 2008 (1 page).

English Summary of Japanese Office Action for corresponding Japanese Application No. 2009-532582 dated Sep. 18, 2012 (6 pages).

Posting Payments, http://msdn.microsoft.com/en-us/library/aa480428(v=MSDN.10).aspx, 1998 (MSDN). (6 pages).

Report of the Auditor General of Canada, Apr. 2003 Report—Chapter 2 (Post Pay). (2 pages).

JPO: Office Action for corresponding JP Application 2009-532582 dated Sep. 18, 2012 in Japanese (6 pages).

Young, Lee W., Jan. 3, 2011 International Search Report with Written Opinion from PCT Application No. PCT/US2010/054531 (9 pp.).

Pilon, Mary, "PayPal Makes a Bid for Student Banking", downloaded from http://blogs.wsj.com/digits/2009/08/14/paypal-makes-a-bid-for-student-ban-king/tab/article, 3 pp. (Aug. 14, 2009).

Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.

Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.

Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.

Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.

Notice of Allowance dated May 9, 2018 for U.S. Appl. No. 12/778,468 (pp. 1-24).

Canadian Office Action dated Jan. 26, 2017 for CA Application No. 2,778,984, 4 pages.

Examination Report for Application No. 3773/DELNP/2012, dated Mar. 25, 2019, 11 pages.

\* cited by examiner

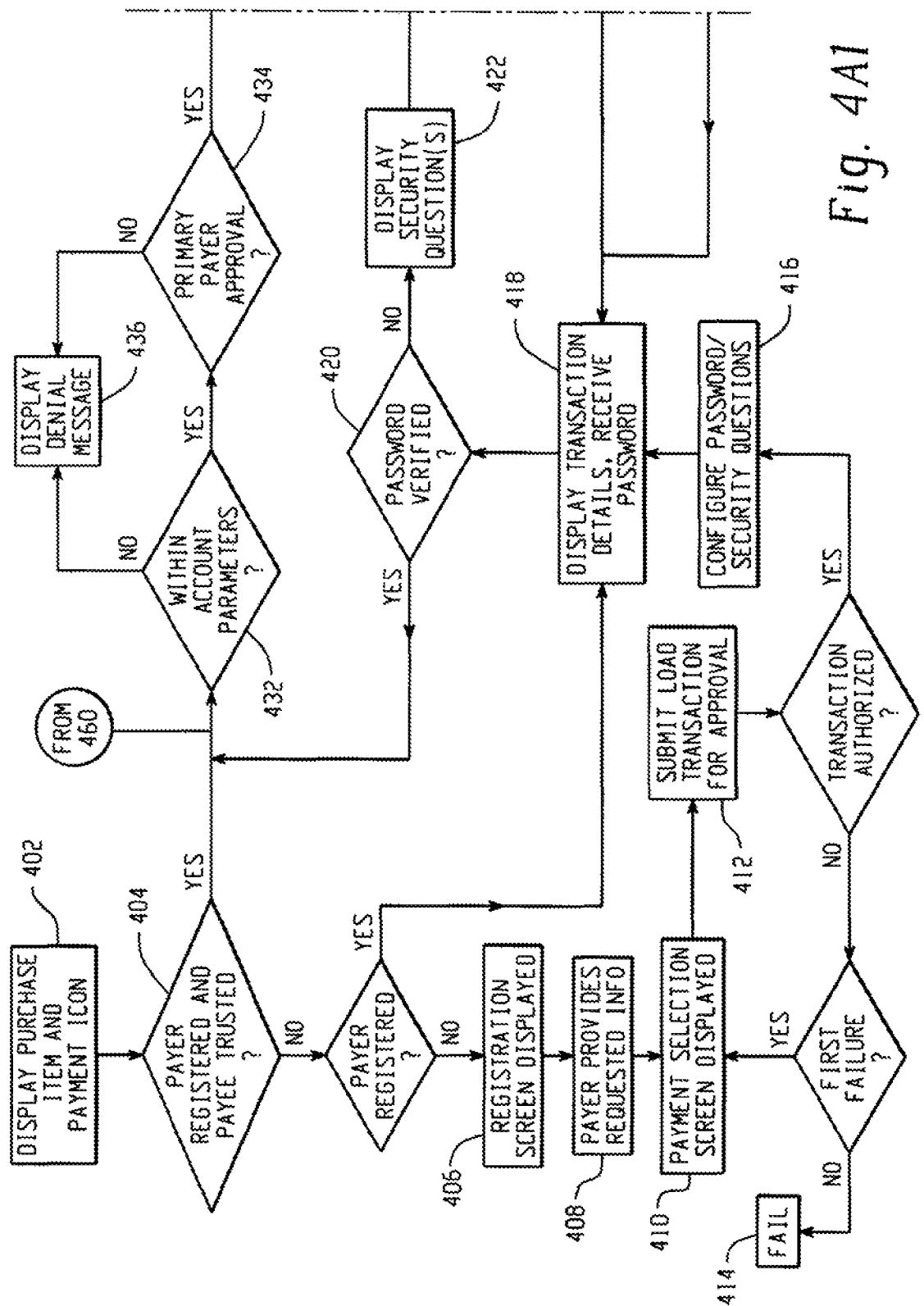
Fig. 4A1

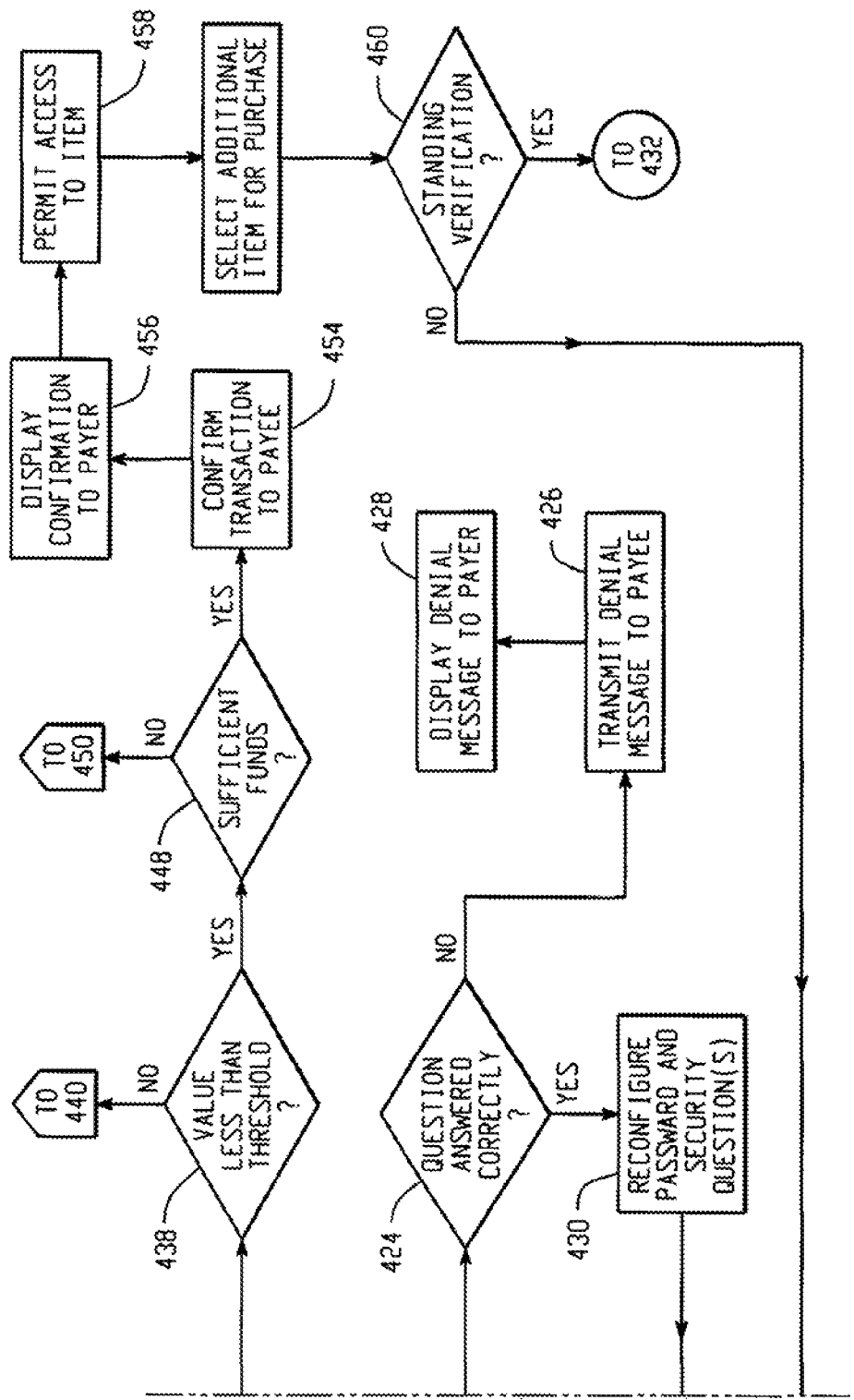
Fig. 4A2

Music Website

Signed in as Jeff Perlman [Sign Out]

Purchase authorization — 2002

Last login: 8 Jul 09 11:20AM

Signed in as Jeff Perlman. Click here to sign in as a different user to enter your password and click the "Pay Now" button below.

Transaction details

Please review the details of your purchase. To approve this payment you will need to enter your password and click the "Pay Now" button below.

Seller: Music Website
Description of purchase: Songs for Children
Purchase amount: $9.95
Available balance: $28.09

Link to this Express Seller

☐ Link my account to my profile on this seller's site. — 2006

By creating a link with this Express Seller, I am authorizing payments from my account for purchases of less than $20.00 or from my default funding option for purchases of $20.00 or more whenever I am signed into this seller's site, without the need to authorize future payments with my password. This is as per the terms and conditions that I have previously read and agreed to.

Authorize payment

Enter your password to authorize this action.

password*: [         ]  I forgot my password — 2004

Click "Pay Now" below to authorize the transaction and transfer the funds to the seller immediately.

[Cancel] [Pay Now]

Amazing News Website

Signed in as Jeff Perlman [Sign Out]

Purchase authorization

Last login: 8 Jul 09 11:20AM

Signed in as Jeff Perlman Click here to sign in as a different user

Transaction details

Please review the details of your purchase. To approve this payment you will need to enter your password and click the "Pay Now" button below.

Seller: Music News
Description of purchase: CRICKET
Purchase amount: $22.20
Available balance: $28.09

Payment options

To complete the transaction, please choose how you would like to pay for this item.

How do you want to pay? ⦿ Pay the exact amount directly from "Visa-XXXX-4242"
○ Pay the exact amount from another funding option [Visa-XXXX-4242 ▽]
☑ Make this my default funding option
Pay with a new funding option
○ Pay using the available balance in my account

MATCH TO FIG. 17B 2200
2202

MATCH TO FIG. 17A

Authorize Express Session

☐ Allow me to continue to shop on this site in an Express Session without being required to re-authorize payment from my account.

By doing so, I am authorizing payments from my account to this site for the duration of this session, without the need to re-authorize each payment with my password, as per the terms and conditions which I have read and agreed to.

For all future purchases during this Express Session you will see an Express button. Click on the Express button and your purchases will be immediately authorized without re-entering your password.

This express relationship is only related to the purchases made during that shopping session and ends when you close the browser window or when more than 15 minutes have passed without a subsequent purchase.

Authorize payment

Enter your password to authorize this action.
password *: [        ]  I forgot my password Click "Pay Now" below to authorize the transaction and transfer the funds to the seller immediately.

2204

[Cancel]  [Pay Now]

Fig. 17B

SYSTEMS AND METHODS FOR BROKERED AUTHENTIFICATION EXPRESS SELLER LINKS

CROSS-REFERENCE TO RELATED APPLICATIONS

This application is a continuation of U.S. patent application Ser. No. 12/778,468, filed on May 12, 2010, which is a continuation-in-part of U.S. patent application Ser. No. 11/870,799, filed on Oct. 11, 2007, now U.S. Pat. No. 8,335,745, which claims priority from U.S. Provisional Patent Application No. 60/829,057, filed on Oct. 11, 2006. U.S. patent application Ser. No. 12/778,468, filed May 12, 2010, also claims priority from U.S. Provisional Patent Application No. 61/256,095, filed on Oct. 29, 2009. The entirety of these priority applications are incorporated herein by reference.

TECHNICAL FIELD

The present disclosure relates generally to computer-implemented systems and methods for electronic commerce and more specifically to electronic commerce user account management.

BACKGROUND

Electronic commerce, commonly known as electronic marketing, e-commerce, or eCommerce, consists of the buying and selling of products or services over electronic systems such as the Internet and other computer networks. The amount of trade conducted electronically has grown extraordinarily with widespread Internet usage. Commerce conducted in this manner utilizes a complex web of innovations in electronic funds transfer, supply chain management, Internet marketing, online transaction processing, electronic data interchange (EDI), inventory management systems, automated data collection systems, and many others. Modern electronic commerce typically uses the World Wide Web at least at some point in the transaction's lifecycle, although it can encompass a wider range of technologies such as e-mail as well.

A large percentage of electronic commerce is conducted entirely electronically for virtual items such as access to premium content on a website. Additionally, much electronic commerce involves the transportation of physical items in some way. Online retailers are sometimes known as e-tailers and online retail is sometimes known as e-tail. Almost all big retailers have electronic commerce presence on the World Wide Web.

With the continued increase in competition on the web, product, content, and service providers must strive to not only produce the best products, content, and services, but they must also compete to offer the most intuitive and fast mechanisms for providing their wares to interested consumers.

SUMMARY

In accordance with the teachings provided herein, systems and methods are described for providing a transaction authorization for a transaction requested by a user to a merchant system. An example method includes the steps of receiving at a funds facilitation system a transaction authorization request from the merchant system, the transaction authorization request including a merchant identification and information identifying an account holder that initiated the transaction authorization request from the merchant system; comparing the merchant identification with merchant data stored in the funds facilitation system to determine if the merchant system has been categorized by the funds facilitation system as a trusted merchant; and based on a determination that the merchant system has been categorized as a trusted merchant, transmitting an electronic communication from the funds facilitation system to the merchant system to approve the transaction authorization request without the funds facilitation system receiving any additional authentication information from the account holder. In certain embodiments, the method may further include the step of accessing a remote user system associated with the account holder to verify that an identification-related cookie issued by the funds facilitation system is stored on the remote user system, the cookie including information to confirm the account holder's authorization to categorize the merchant system as a trusted merchant, and wherein transmission of the electronic communication approving the transaction authorization request without requiring additional authentication information is further based on a successful verification of the cookie.

In another example method, a transaction authorization may be provided from a funds facilitation system that requires a funds facilitation user authentication, where the transaction authorization is provided to a trusted merchant system without requiring user input of any funds facilitation user authentication information in excess of merchant authentication information required by the merchant system. The method may include receiving a transaction authorization request from the merchant system, where the transaction authorization request contains a merchant ID, a merchant user ID, and a transaction amount. A funds facilitation system user ID may be identified based on the merchant ID and the merchant user ID, and satisfaction of the funds facilitation user authentication is determined based on the merchant system associated with the merchant ID having a trusted status with the funds facilitation system and the existence of a funds facilitation system user ID that is associated with both the merchant ID and the merchant user ID. A transaction authorization message or a transaction denial message may be provided to the merchant system based on account information associated with the funds facilitation system user ID and the transaction amount.

As a further example, a computer-implemented system for providing a transaction authorization for a transaction requested by a user to a merchant system, where the transaction authorization is provided from a funds facilitation system that requires a funds facilitation user authentication, where the transaction authorization is provided to a trusted merchant system without requiring user input of any funds facilitation user authentication information in excess of merchant authentication information required by the merchant system may include a processor and a computer-readable storage medium containing instructions. When executed on the processor, the instructions cause the processor to perform operations that may include receiving a transaction authorization request from the merchant system, where the transaction authorization request contains a merchant ID, a merchant user ID, and a transaction amount. A funds facilitation system user ID may be identified based on the merchant ID and the merchant user ID, and satisfaction of the funds facilitation user authentication is determined based on the merchant system associated with the merchant ID having a trusted status with the funds facilitation system and the existence of a funds facilitation system user ID that is associated with both the merchant ID and the merchant user ID. A transaction authorization message or a transaction denial message may be provided to the merchant system based on account information associated with the funds facilitation system user ID and the transaction amount. In certain embodiments, the instructions may further cause the processor to access a remote user system to verify that an identification-related cookie issued by the funds facilitation system is stored on the remote user system, the cookie including information to confirm the user's authorization of the trusted status of the merchant system, and wherein satisfaction of the funds facilitation user authentication is further based on a successful verification of the cookie.

As an additional example, a computer-readable storage medium or mediums may be encoded with instructions that when executed, cause a computer to perform a method of providing a transaction authorization for a transaction requested by a user to a merchant system, where the transaction authorization is provided from a funds facilitation system that requires a funds facilitation user authentication, where the transaction authorization is provided to a trusted merchant system without requiring user input of any funds facilitation user authentication information in excess of merchant authentication information required by the merchant system. The method may include receiving a transaction authorization request from the merchant system, where the transaction authorization request contains a merchant ID, a merchant user ID, and a transaction amount. A funds facilitation system user ID may be identified based on the merchant ID and the merchant user ID, and satisfaction of the funds facilitation user authentication is determined based on the merchant system associated with the merchant ID having a trusted status with the funds facilitation system and the existence of a funds facilitation system user ID that is associated with both the merchant ID and the merchant user ID. A transaction authorization message or a transaction denial message may be provided to the merchant system based on account information associated with the funds facilitation system user ID and the transaction amount.

Another example method for processing an electronic payment transaction between a merchant system and a funds facilitation system may include the following steps: receiving at the merchant system, authentication information that identifies an account holder with the merchant system; receiving at the merchant system, a transaction request that specifies payment from the funds facilitation system; comparing the authentication information with account information stored in a database associated with the merchant system to identify a merchant user identification associated with the account holder; generating a transaction authorization request that includes the merchant user identification and that also includes a merchant identification, the merchant identification being an identification associated with the merchant system in the funds facilitation system; transmitting the transaction authorization request from the merchant system to the funds facilitation system so that the funds facilitation system can compare the merchant identification with merchant data stored in the funds facilitation system to determine if the merchant system has been categorized by the funds facilitation system as a trusted merchant, and based on a determination that the merchant system has been categorized as a trusted merchant, transmit an electronic communication from the funds facilitation system to the merchant system to approve the transaction authorization request without the funds facilitation system receiving any additional authentication information from the account holder; receiving the electronic communication from the funds facilitation system at the merchant system; and based upon receipt of the electronic communication, the merchant system approving the transaction request.

Another example method of processing an electronic payment transaction with a merchant system may include the steps of: receiving at a funds facilitation system a first transaction authorization request from the merchant system, the first transaction authorization request including information identifying an account holder that initiated the first transaction authentication request from the merchant system; in association with the first transaction authorization request, receiving authentication information from the account holder to verify the identity of the account holder in relation to an account with the funds facilitation system; based on a successful verification of the authentication information, generating cookie information associated with the account holder and the merchant system and storing the cookie information at a remote user system of the account holder; in response to the first transaction authorization request and the successful verification of the authentication information, transmitting a first electronic communication from the funds facilitation system to the merchant system to approve the first transaction authorization request; receiving at the funds facilitation system a subsequent transaction authorization request from the merchant system, the subsequent transaction authorization request including information identifying the account holder that initiated the subsequent transaction authentication request from the merchant system; in response to the subsequent transaction authorization request, verifying that the cookie information is stored at the remote user system of the account holder and is valid; and based on a successful verification that the cookie information is stored at the remote user system and is valid, transmitting a subsequent electronic communication from the funds facilitation system to the merchant system to approve the subsequent transaction authorization request without the funds facilitation system again receiving the authentication information from the account holder.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 4A1, 4A2, and 4B depict a flow diagram for an exemplary micropayment purchase from a payee website.

FIG. 15 is a screenshot depicting a user interface for creating an express-seller link between a merchant account and a funds facilitation system account.

FIGS. 17A and 17B depict a screenshot of a user interface for creating an express-session link between a merchant account and a funds facilitation system account.

DETAILED DESCRIPTION

A payer is an entity that engages in a value transfer, such as an individual or a small business. The payer participates in a transaction with a payee, usually by purchasing a good or service from the payee and/or by exchanging items, services or other value with the payee.

A payee is a second entity that engages in a value transfer. A payee participates in a transaction with a payer, usually by providing a good or service to the payer in exchange for value and/or by exchanging items, services or other value with the payer.

A transaction is a flow of value between entities, such as a payer and a payee.

A micropayment transaction is a transaction in which the value to be transferred is less than a threshold value, such as, for example and without limitation, approximately five dollars.

Figure 1:
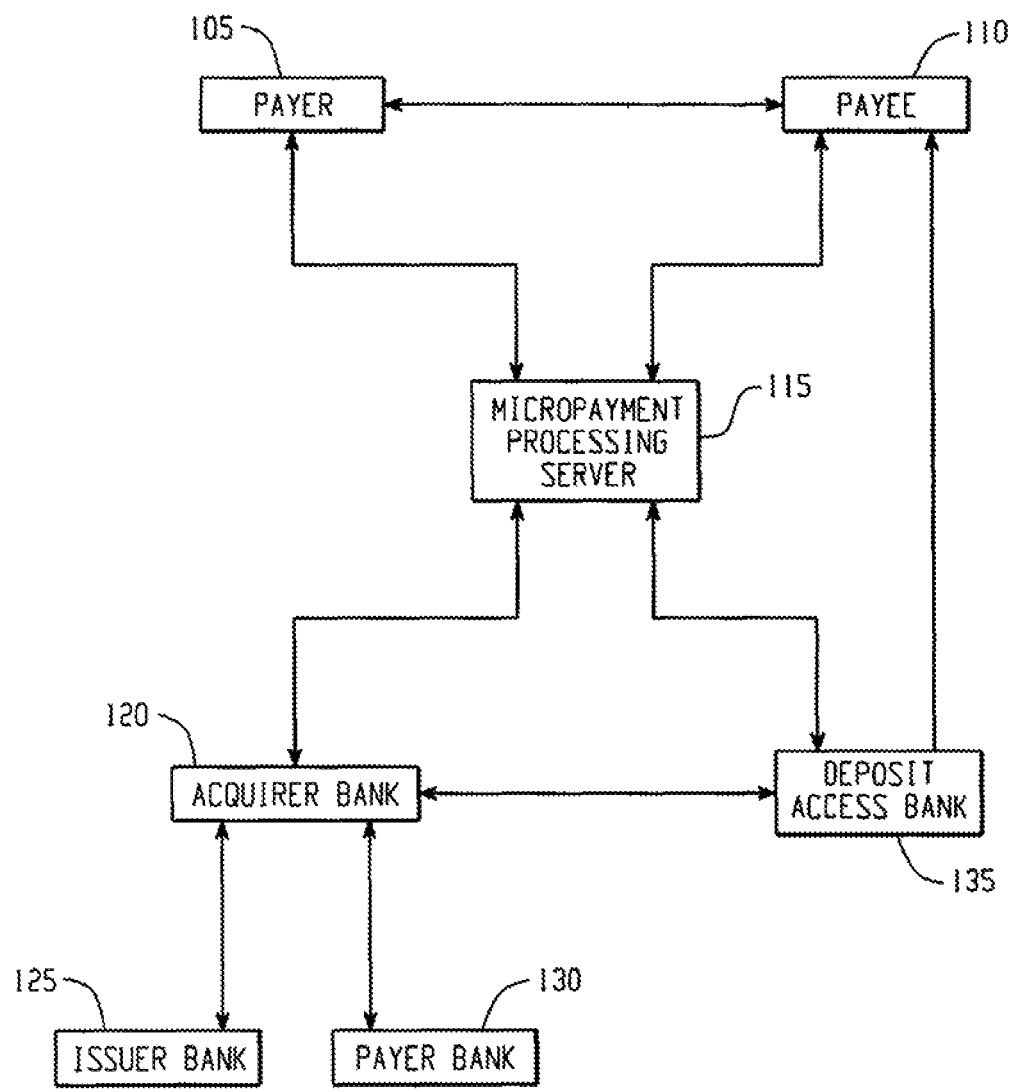
FIG. 1 depicts a dataflow diagram for exemplary participants in a micropayment transaction.

FIG. 1 depicts a dataflow diagram for exemplary participants in a micropayment transaction according to an embodiment. As shown in FIG. 1, the micropayment transaction processing system may include a payer 105, a payee 110, a micropayment processing server 115, an acquirer bank 120, an issuer bank 125, a payer bank 130, and a deposit access bank 135 to manage the float of value in the system. Exemplary communications between two parties are depicted by the lines in FIG. 1 and are described in more detail below in reference to FIGS. 2 and 3. Communicating parties may communicate with each other via, for example, the Internet, and intranet and/or any other data network. Other communication methods, such as a telephone, a PDA, a Blackberry, a gaming console, an interactive kiosk and the like may also be used within the scope of the present disclosure.

Figure 2:
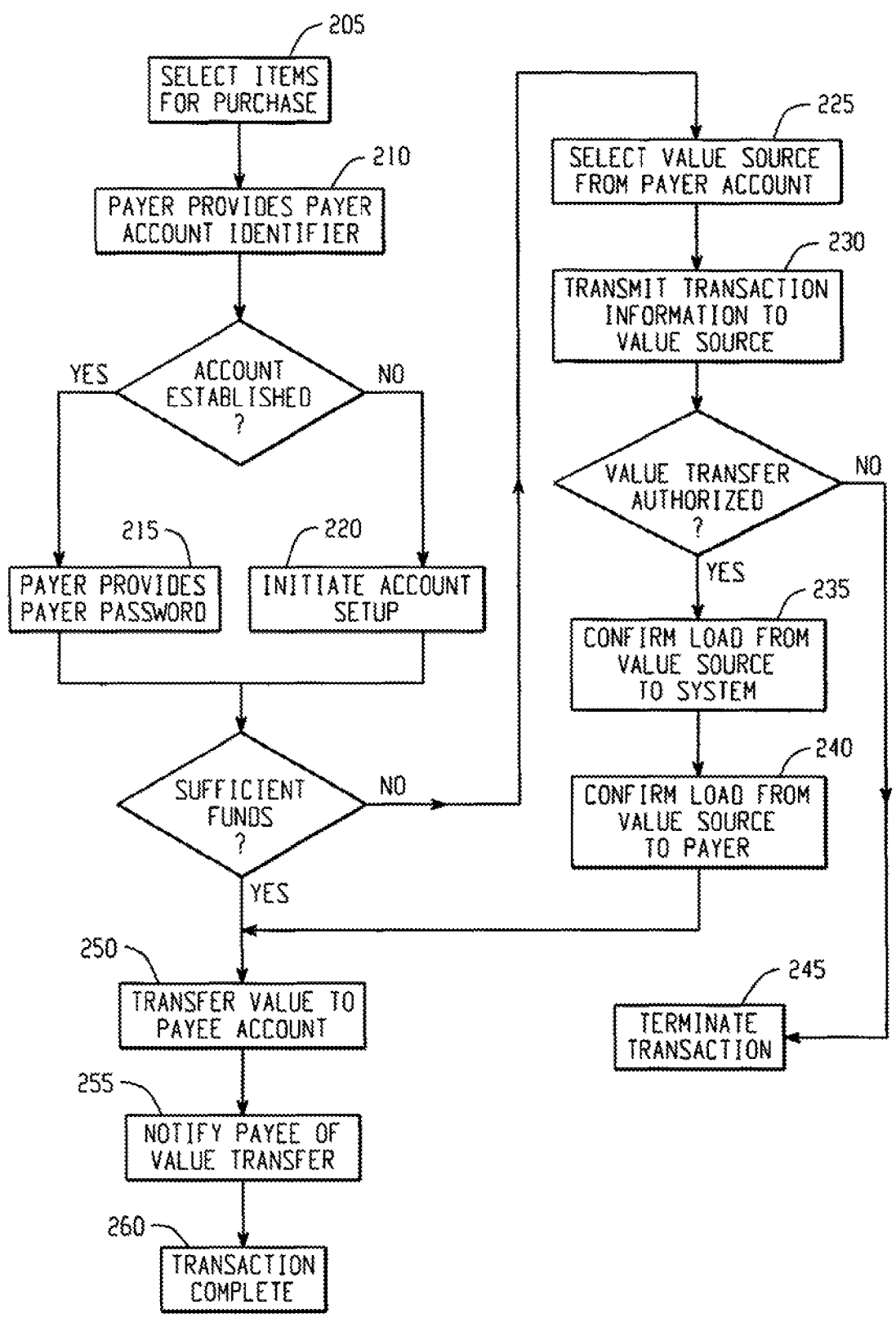
FIG. 2 depicts a flow diagram for an exemplary process of processing a micropayment transaction.

FIG. 2 depicts a flow diagram for an exemplary process of processing a micropayment according to an embodiment. As shown in FIG. 2, a payer 105 may shop at an online payee 110 and, for example, select 205 one or more goods and/or services for purchase from the payee. If the transaction is a micropayment transaction, a list of selectable payment methods may include an icon for a micropayment processing system 115. The payer 105 may select the micropayment processing system 115. The payer may initiate processing of the micropayment transaction by submitting 210 an identifier, such as, for example and without limitation, an email address, a "user ID," a telephone number and/or any portion thereof. In an embodiment, a "cookie" or other persistent data located on the payer's network access device may relate to such an identifier. If the payer 105 has already established an account with the payment processing system 115, the payer 105 may be directed to the system (or to a location within the payee's website 110 designed to receive information on behalf of the micropayment processing system) to provide 215 a password to authorize payment to the payee. Other authentication methods, such as, without limitation, biometric devices or cryptographic tokens, may be used to authenticate the payer to the micropayment processing system. If the payer has not already established an account with the micropayment processing system 115, the payer 105 may be directed to a registration sub-system in order to initiate 220 an account setup routine.

Upon completion of the account setup routine or once the password is entered or the payer is otherwise authenticated to the micropayment processing system if an account had previously been established, a determination may be made as to whether sufficient value is present to complete the transaction. If not, the payer 105 may select a value source from which funds are received 225 by the micropayment processing system 115. In an embodiment, funds may be received 225 from, for example and without limitation, credit card, debit card, a direct debit from a bank account via, for example, Automated Clearing House (ACH), direct deposit or the like, over the counter to an agent, and/or from a deposited amount. The micropayment processing system 115 may transmit 230 the transaction information supplied by the payer 105 to the acquirer bank 120. The acquirer bank 120 may facilitate an authorization procedure with a direct debit account or the card acquirer. If the payer 105 is authorized, the acquirer bank 120 may confirm 235 the load of value to the micropayment processing system 115, which forwards 240 the confirmation to the payer. Otherwise, the micropayment process may terminate 245. In an alternate embodiment, the payer 105 may be provided with one or more additional opportunities to provide proper authorizing information to the micropayment processing system 115.

Once sufficient value is present to complete the transaction, the micropayment processing system 115 may transfer 250 funds from any payer account to any payee account. In an embodiment, a payer account and a payee account may be attributes of the same account. The micropayment processing system 115 may then notify 255 the payer 105 and the payee 110 that the transaction has successfully completed. The payer 105 may then be returned 260 to the payee web site 110.

Figure 3:
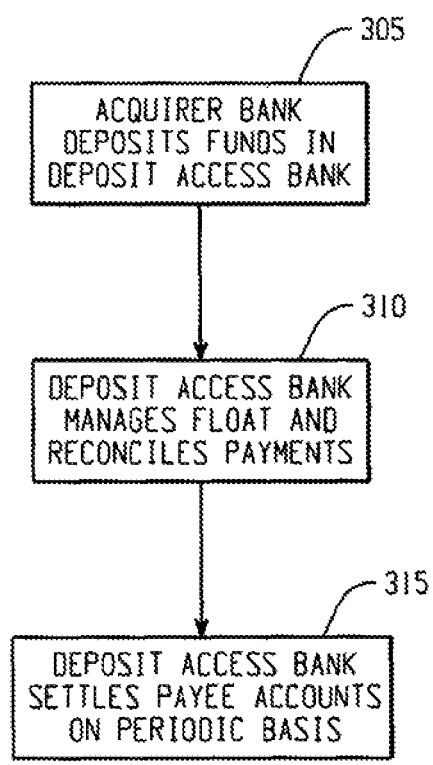
FIG. 3 depicts a flow diagram for an exemplary settlement process for a micropayment processing system.

FIG. 3 depicts a flow diagram for an exemplary settlement process for a micropayment processing system according to an embodiment. As shown in FIG. 3, the acquirer bank 120 may deposit 305 funds into an account operated by the deposit access bank 135. The deposit access bank 135 may manage the float (float occurs when an account in the system retains a positive balance of funds) and reconcile 310 payments for the micropayment processing system 115. The deposit access bank 135 may settle 315 its account with each payee on, for example, a periodic basis. For example, the deposit access bank 135 may settle 315 its account with each payee on an hourly, daily, weekly or monthly basis. Other settlement periods may also be used within the scope of this disclosure.

Figure 4B:
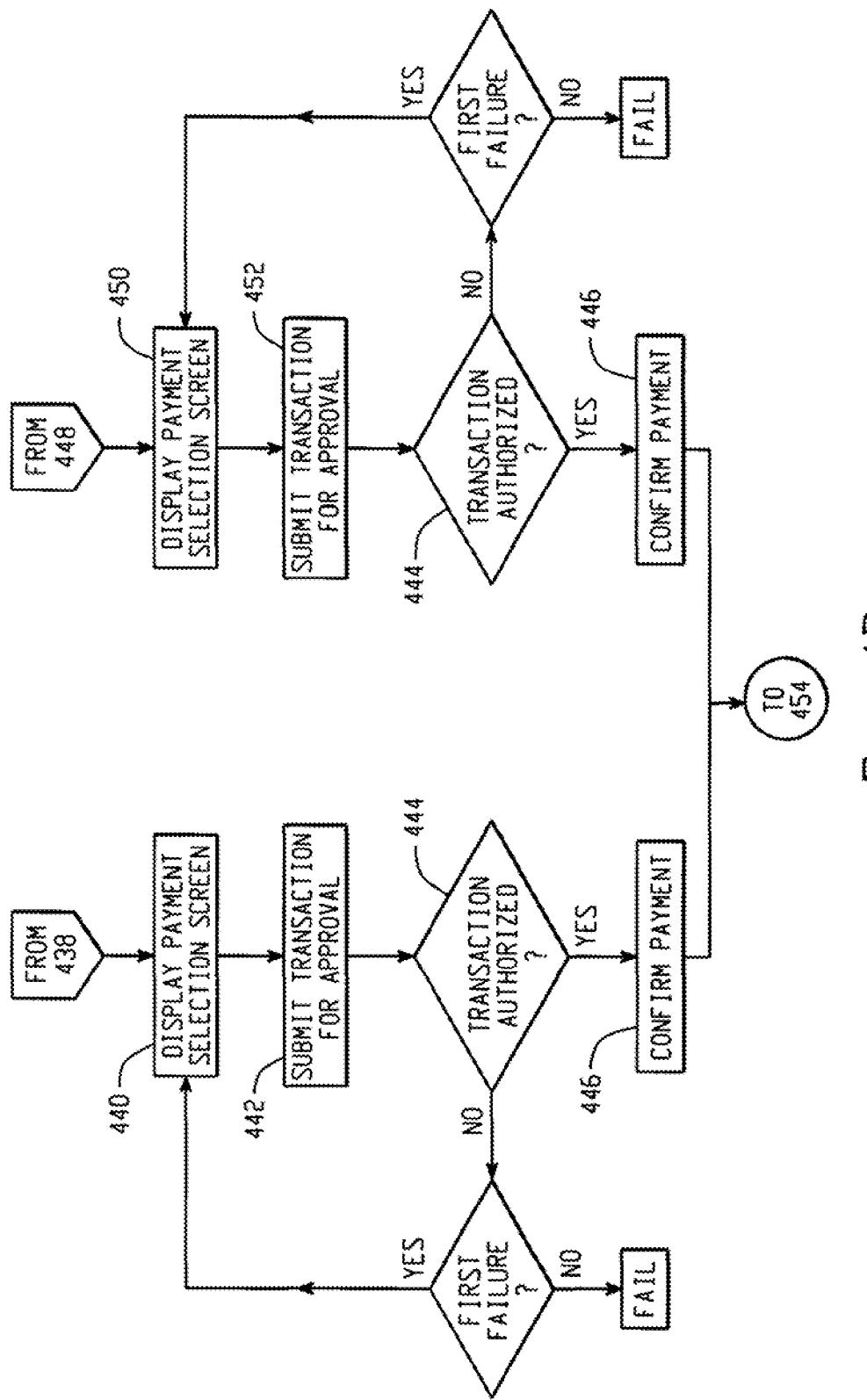

FIGS. 4A and 4B depict a flow diagram for an exemplary micropayment transaction performed on a payee web site according to an embodiment. As shown in FIGS. 4A and 4B, a payer may access the payee website via a user interface, such as a web browser. The user interface may display 402 an item or service for purchase to the payer with a message offering the option to pay for the item using a micropayment processing system and a selectable micropayment icon if the item or service has a value below a threshold. In an embodiment, additional information may be displayed 402, such as a link to an information page describing the micropayment processing system. In an embodiment, the micropayment icon may be selected to initiate micropayment transaction processing.

Determinations may be made 404 as to whether the payer has previously registered with the micropayment processing system and whether the payee is a Trusted Merchant. In an embodiment, a payee may be required to submit to a qualifying process to be considered a Trusted Merchant. A payer may further be required to select a payee from a list of payees that have been qualified as Trusted Merchants in order for the payee to be a Trusted Merchant for that payer.

In an embodiment, a payer may elect to have a verification code or token stored as part of the payer's registered profile with a Trusted Merchant. The payer may make this request when interfacing with the Trusted Merchant or with the micropayment processing system (e.g. through Internet Banking or an interface facilitated to the micropayment processing system independent of a transaction by the Trusted Merchant). Upon receipt of a cardholder request, the micropayment processing system may provide a verification code or token to the Trusted Merchant for storage as part of the registered payer's profile. In an embodiment, the verification code or token may be generated in response to the payer's request so that it only verifies transactions by the payer made at the specified Trusted Merchant, may be provided to the Trusted Merchant in a fully encrypted form, and may only be decryptable by the micropayment processing system. In an embodiment, the token may allow session-based authentication. In another embodiment, the token may be used without session-specific authentication. When the payer performs a transaction with the Trusted Merchant, the payee may submit a payment authorization request accompanied by the payer's verification code or token to the micropayment processing system. The micropayment processing system may decrypt the verification code or otherwise verify a token upon receipt of the payment authorization request and provide an appropriate payment authorization response with all necessary data elements. The payee website may receive the payment authorization response and process the response as appropriate. In an embodiment, if the payer has previously registered, the Trusted Merchant may engage in a transaction with the registered payer without resubmitting identifying information for the parties, such as a password, an email address or the like.

If the payer has not previously been registered, a registration screen may be displayed 406 requesting profile information from the payer. For example, the payer may provide a name, address, telephone number, and/or the like. Once the payer provides 408 the requested information, a payment selection screen may then be displayed 410. The payment selection screen may enable the payer to select a payment type, such as a Visa®-branded credit card, the source details for the selected payment type and a load amount. In an embodiment, one or more selections for a load amount may be displayed via a pull-down menu. The micropayment processing system may submit 412 the load transaction to an external authorization service. If the transaction is not authorized, the micropayment processing system may display 410 the payment selection screen again. In an embodiment, if the load transaction fails a second time, the micropayment transaction may fail 414. If the load transaction is authorized, the micropayment payment system may display 416 a load confirmation screen, which requests, for example, a password and selections and answers for, for example, three security questions. In other examples, additional or alternate information may be requested from the user within the scope of this disclosure. In addition, an alternate number of security questions, other security verification methodologies and/or load transaction failures may also be included within the scope of this disclosure.

If the payer successfully completes the registration process or if the payer is determined to be registered, but the payee is not a Trusted Merchant, in step 404, the micropayment processing system may display 418 a purchase amount, a name for the payee and a description of the item for purchase. The system may further display 418, for example, a text entry field in which the payer is requested to enter an identifier, such as an email address, and a password corresponding to the entered identifier. A determination may then be made 420 as to whether the entered password corresponds to the identifier. If not, the micropayment processing system may display 422 one or more security questions pre-selected by the payer during the registration process. In an embodiment, the displayed security question may be selected randomly from the pre-selected security questions. The payer's answer to the displayed security question may be compared 424 with the answer provided during registration. If an improper answer is provided, a denial message may be transmitted 426 to the payee. The payee website may then display 428 a message requesting an alternate form of payment from the payer. If the proper answer is provided, the user may reconfigure and confirm 430 the password for the account and alternately select new security questions and responses. The process may then return to step 418.

If the entered password is determined 420 to correspond to the identifier or if the payer is registered and the payee is a Trusted Merchant in step 404, one or more further determinations may be made. For example, a determination may be made 432 as to whether the transaction amount falls within user-defined account parameters. Such parameters may include, for example and without limitation, whether the payee has been allowed and/or blocked, whether a total value limit is satisfied, whether the transaction satisfies value limits for the payee and/or whether the transaction satisfies time limitations for the account. Other account parameters may be defined within the scope of this disclosure on, for example, a per-payer, per-payee and/or per-account basis. Moreover, for transactions made by payers other than the primary payer for an account, a determination may be made 434 as to whether the primary payer has permitted the transaction. For example, a parent may set a limitation on transactions that a child performs using the account, such as the type, dollar amount or the like for such transactions. If any user-defined account parameters and/or primary payer parameter is not satisfied for a transaction, the payee website may display 436 a denial message to the payer and request that an alternate form of payment be selected.

If all parameters are satisfied, a determination as to the relationship between a transaction value and a threshold may be made 438. For example, if the transaction value is greater than and/or equal to a pre-defined threshold, a payment screen may be displayed 440 to the payer. The payment screen may include, for example and without limitation, one or more default payment sources and details, such as a masked account number, for each source. The payer may select a source and the transaction may be submitted 442 for external authorization. If the issuing system of selected payment source authorizes 444 the transaction, a screen may optionally be displayed 446 to the payer listing, for example, the purchase amount, the payee name, a description of the purchased goods and/or services and the like. The payer may submit the payment without providing additional information.

If the transaction value is less than and/or equal to a pre-defined threshold, a micropayment processing system may be selected for processing the transaction. The micropayment processing system may determine 448 whether sufficient funds remain in the payer's account. If not, the micropayment processing system may display 450 a screen requesting that the payer add additional funds to the account from a default payment source, such as a credit card, a bank account, or the like. In an embodiment, the screen may present the default payment source with masked information, such as the last four digits of a credit card number, bank account number, or the like. In an embodiment, the payer may provide an alternate payment source. In an embodiment, amounts to add to the account may be presented in a pull-down menu or similar method having pre-selected amounts. In an embodiment, the screen may include a text entry field in which the payer may specify a particular amount. Once the payer specifies an amount to add to the account, the micropayment processing system may submit 452 the load transaction for external authorization. If the issuing system of the selected payment source. If the issuing system of the selected payment source authorizes 444 the transaction, a screen may optionally be displayed 446 to the payer listing, for example, the purchase amount, the payee name, a description of the purchased goods and/or services and the like. The payer may submit the payment without providing additional information.

If sufficient funds remain in the account or are added to the account, a transaction confirmation may be provided 454 to the payee website. The payee website, upon receipt of the confirmation from the micropayment processing system, may display 456 a confirmation message to the payer and permit 458 access to the goods and/or services. In an embodiment, if the payer desires 460 to purchase additional goods and/or services, the micropayment purchase process for such additional goods and/or services may skip to, for example, step 432. In an embodiment, the micropayment purchase process may skip to step 432 only if the additional goods and/or services are sought to be purchased during a single access session. In an embodiment, a payer may be required to provide a password again if, for example, a payer does not make a purchase within a pre-defined time period of a previous purchase, a payer has accessed a different website or the like. Alternately, the micropayment purchase process may skip to step 432 if the payee is a Trusted Merchant.

Figure 5:
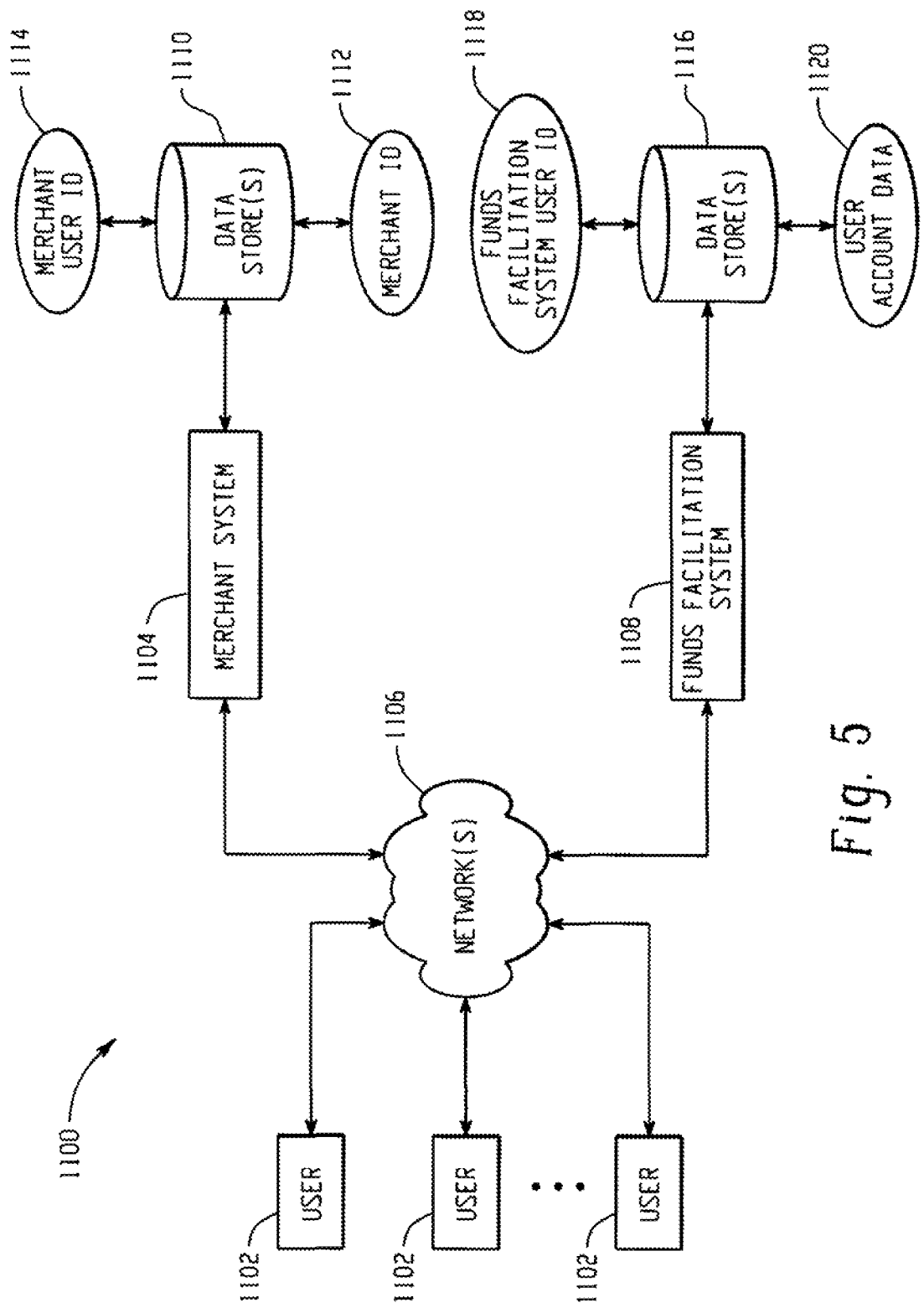
FIG. 5 depicts a computer-implemented environment wherein users can interact with a merchant system hosted on one or more servers through a network.

FIG. 5 depicts at 1100 a computer-implemented environment wherein users 1102 can interact with a merchant system 1104 hosted on one or more servers through a network 1106. The system contains software operations or routines for receiving a transaction request from a user 1102 and providing fulfillment or notice of fulfillment of the requested transaction or a denial of the transaction request to the user 1102. The users 1102 can interact with the merchant system 1104 through a number of ways, such as over one or more networks 1106. One or more servers accessible through the network(s) 1106 can host the merchant system 1104.

The computer-implemented environment further includes a funds facilitation system 1108. The funds facilitation system 1108 may be configured for identifying the availability of funds in a user account, acquiring funding for a user account, disbursing funding to a merchant to pay for a merchant performing a transaction, for determining whether a merchant should or should not perform a transaction, as well as other operations. The funds facilitation system 1108 is hosted on one or more servers through one or more networks 1106.

In an example operation, a user 1102 accesses a web page hosted on the merchant system 1104 via the one or more networks 1106. For example, the web page may list a number of book titles that are available for download from the merchant system in exchange for a payment from the user. The user 1102 indicates his desire to download one of the listed books by clicking a button on the web page that initiates a transaction request to the merchant system 1104.

Upon receipt of the transaction request, the merchant system 1104 prepares a transaction authorization request for authorization of and facilitating payment for the transaction requested by the user 1102. The merchant system 1104 may access one or more data stores 1110 to acquire a merchant identification (ID) 1112 identifying the merchant system 1104. The merchant system 1104 may further access the one or more data stores 1110 to access a merchant user identification (ID) 1114 associated with the user 1102 that provided the transaction request. The merchant user ID 1114 associated with the user 1102 may be identified based on a prior user identification at the merchant system 1104, such as the user 1102 providing a username and password combination. The merchant system 1104 packages the merchant ID 1112 the merchant user ID 1114 as well as a transaction amount associated with the transaction requested by the user 1102 into a transaction authorization request that is transmitted to the funds facilitation system 1108 via the one or more networks 1106.

The funds facilitation system 1108 receives the transaction authorization request from the merchant system 1104 and accesses one or more data stores 1116 responsive to the funds facilitation system 1108 to identify a funds facilitation system user ID 1118 associated with the merchant user ID included in the transaction authorization request. The funds facilitation system user ID 1118 accessed by the funds facilitation system 1108 provides a link to user account data 1120 for the user 1102 that provided the transaction request. The user account data 1120 may include data related to one or more accounts related to the user 1102 including prepaid accounts, stored value accounts, credit accounts, debit accounts, or the like. In one embodiment, the stored value accounts may be useful for conducting low value transactions. In another embodiment, the account may be a credit, debit, or other account, or an alias for such an account that may be more appropriate for higher value transactions. The funds facilitation system 1108 may determine the viability of the transaction described in the transaction authorization request from the merchant system 1104 based on the provided transaction amount, a funds available value from the user account data 1120, as well as other user account settings and data and other criteria.

If the funds facilitation system 1108 determines that the proper criteria for a transaction approval are met, the funds facilitation system 1108 may transfer the transaction amount from the user's account to the merchant and provide a transaction authorization to the merchant system 1104. Upon receipt of a transaction authorization from the funds facilitation system 1108, the merchant system 1104 may make the book title available for immediate download by the user 1102 with the knowledge that compensation for the transaction has been provided to the merchant.

While the above example describes providing a digital book to a user 1102 in response to a transaction request, the system 1100 may be utilized in a multitude of other scenarios. For example, instead of providing immediate digital content, the merchant may instead mail a physical product to the user 1102 or perform a service, such as a healthcare service, for the user 1102 upon receipt of a transaction authorization.

The funds facilitation system 1108 may comprise one or more servers containing software operations or routines for creating and maintaining accounts for the users 1102; for enabling the users 1102 to conduct transactions with one or more websites; for enabling users 1102 to initiate dispute proceedings with one or more websites and to automate the communications related to the dispute and the resolution of the dispute; to initiate and transmit alerts to users, websites, and or system administrators based upon pre-defined and/or customizable parameters; to configure and apply fees to transactions; and to conduct reporting as may be relevant to the merchant systems 1104, the funds facilitation system 1108 and/or the users 1102. Furthermore, the one or more servers of the funds facilitation system may additionally contain software operations or routines related to managing the accounts (such as by updating billing addresses, delivery addresses, user preferences, and the like); for enabling users to authorize and manage recurring payments or to pre-authorize payments; for enabling users to pre-authorize or prohibit (i.e., blacklist) websites and/or transactions; and/or for enabling users to manage accounts and conduct transactions using mobile electronic devices or any other electronic device such as internet-connected gaming consoles, a digital set-top box, or similar devices.

Figure 6:
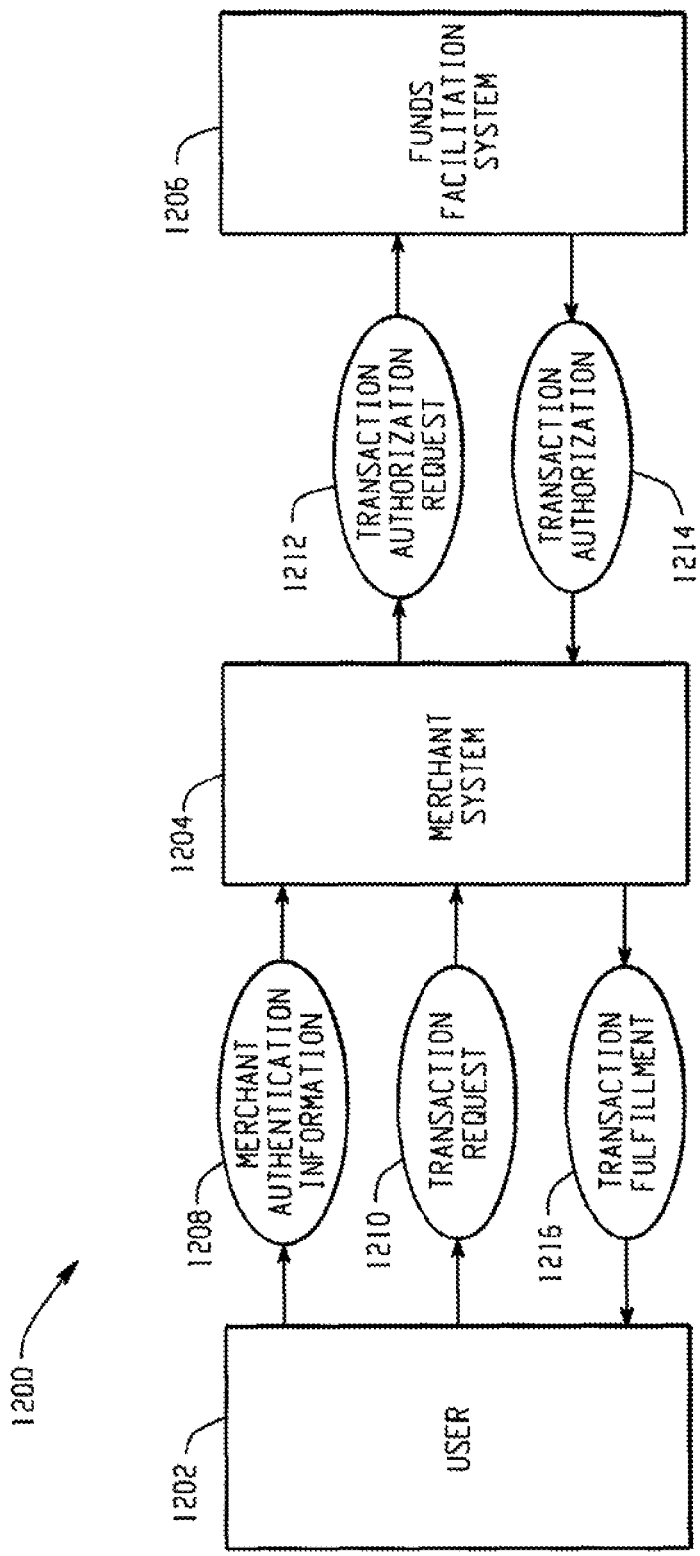
FIG. 6 is a block diagram depicting communications in a typical transaction among a user, merchant system, and funds facilitation system.

FIG. 6 is a block diagram depicting communications in an example transaction among a user 1202, merchant system 1204, and funds facilitation system 1206. The user 1202 logs into the merchant system 1204 by providing merchant authentication information 1208 to the merchant system 1204. For example, the user 1202 may access a webpage provided by the merchant system 1204 and provide a username and password combination in response to a login prompt on the webpage. The user 1202 logging onto the merchant system 1204 enables the merchant system 1204 to associate a merchant user ID to the user 1202 for tracking user activity. After having logged into the merchant system 1204, the user may transmit a transaction request 1210 to the merchant system 1204. (In some configurations, the user 1202 may be prompted to supply merchant authentication information 1206 after the user 1202 has transmitted a transaction request 1208.) The transaction request 1210 may describe a product, content, or service the user 1202 wishes to receive from the merchant associated with the merchant system 1204. For example, the transaction request 1210 may describe tickets to a sporting event described on the merchant's website that the user 1202 would like to purchase.

Upon receipt of the transaction request 1210 from the user 1202, the merchant system seeks data from a funds facilitation system 1206 as to whether the merchant should provide the transaction identified in the transaction request 1210. The merchant system 1204 seeks such authorization via a transaction authorization request 1212. A transaction authorization request 1212 includes a merchant ID that identifies the merchant associated with the merchant system 1204, a merchant user ID that identifies the user 1202 of the merchant system 1204 and a cost or transaction amount associated with the transaction that the user has requested. The transaction authorization request 1212 may further include a transaction description, a merchant transaction ID, a date/time that the transaction request 1210 was received, a date/time that the transaction authorization request was generated, a redirection URL for redirecting a user interface following the transaction, as well as other data. The transaction authorization request 1212 may be signed by the merchant system 1204 to authenticate the source of the request 1210 to the funds facilitation system 1206.

The funds facilitation system 1206 receives the transaction authorization request 1212 and determines whether the transaction requested by the user 1202 should be authorized and facilitates the transfer of funds from the user to the merchant providing the services upon authorization of the request. One or more accounts associated with the user 1202 may be associated with the funds facilitation system 1206. The funds facilitation system 1206 may be an actual account provider or may have access to information regarding one or more of the user's accounts and access to facilitate transfers regarding one or more of the user's account. For example, a funds facilitation system 1206 may be associated with a stored value account for a user, where a user is able to store a sum of money for easy, secure access in making online purchases. An example stored value account could allow a user 1202 to retain up to $1,000 in an online account from which the user 1202 may direct payments to be made for digital music downloads. The funds facilitation system 1206 may also have data acquisition capabilities regarding credit available for one or more of the user's credit cards and funds balances for a user's checking and savings accounts. The funds facilitation system 1206 may also be able to access funds or credits associated with user accounts or initiate transactions with those accounts to facilitate payment of merchants from which transactions are requested.

The data relating one or more accounts to a user 1202 and for facilitating transactions among the accounts may be user provided. The user 1202 may create an account with the funds facilitation system 1206 and associate one or more accounts with the user's funds facilitation system account. The user 1202 may also provide needed access to and data regarding the associated accounts to enable transactions using the one or more accounts. The funds facilitation system 1206 may provide a number of other functionalities to the user 1202 including enabling the user to conduct transactions with one or more websites; enabling users to initiate dispute proceedings with one or more websites and to automate the communications related to the dispute and the resolution of the dispute; initiating and transmitting alerts to users, websites, and or system administrators based upon pre-defined and/or customizable parameters; and conducting reporting as may be relevant to the users. Furthermore, the funds facilitation system 1206 may additionally contain software operations or routines related to managing the accounts (such as by updating billing addresses, delivery addresses, user preferences, and the like); for enabling users 1202 to authorize and manage recurring payments or to pre-authorize payments; for enabling users to pre-authorize or prohibit (i.e., blacklist) websites and/or transactions; and/or for enabling users 1202 to manage accounts and conduct transactions using mobile electronic devices or any other electronic device such as internet-connected gaming consoles, a digital set-top box, or similar devices. Users may access a funds facilitation system account by providing funds facilitation system account authentication information such as a username and password combination to a funds facilitation system web page or portal.

Upon receipt of a transaction authorization request 1212, the funds facilitation system 1206 may determine a funds facilitation system user ID based on the merchant ID and merchant user ID included in the transaction authorization request. For example, the funds facilitation system 1206 may know that user number "0123456" of merchant system "98765" is associated with funds facilitation system user "123." The funds facilitation system 1206 may be informed of this association between merchant accounts and funds facilitation system user accounts via a user linking the accounts, as will be discussed in further detail with respect to FIG. 14, herein.

The funds facilitation system may require additional authentication from the user 1202 to facilitate the requested transaction depending on the relationship between the merchant system 1204 and the funds facilitation system 1206. If the merchant system 1204 is considered a trusted merchant system, the funds facilitation system 1206 may recognize the merchant system's authentication of the user 1202 as being sufficient for ensuring that the request is in fact from the user 1202. If the merchant system 1204 does not have a trusted system relationship with the funds facilitation system 1206, then the funds facilitation system 1206 may request additional user authentication information. For example, the funds facilitation system 1206 may request that the user provide their funds facilitation system username and/or password before authorizing the requested transaction. In this manner, fraudulent transactions may be reduced by requiring additional verifications for transactions involving non-trusted merchant systems, while transactions involving trusted merchant systems may be streamlined, enabling easier user transactions.

Upon identification and validation of the user 1202 by the funds facilitation system 1206, the funds facilitation system 1206 makes a determination as to whether the requested transaction should be authorized. For example, if a stored value account is associated with the user's funds facilitation system account, the stored value account is identified as the default payment account, and the stored value account contains sufficient funds for making a purchase of the transaction amount, then the funds facilitation system may authorize the transaction and facilitate transfer of the transaction amount from the stored value account to the merchant. If the stored value account contains insufficient funds, then the transaction may be denied, or the merchant system 1204 may be instructed to provide an interface to the user 1202 to identify an additional funding source or to refill the stored value account. The funds facilitation system 1206 communicates the authorization decision to the merchant system 1204 via a transaction authorization 1214. The transaction authorization 1214 may contain the merchant user ID for the user 1202, a transaction identifier value, a transaction authorization message, as well as other data.

Upon receipt of a transaction authorization 1214 from the funds facilitation system 1206, the merchant system may then fulfill the transaction as appropriate. For example, if the transaction request 1210 is for a digital music download, the merchant system may provide transaction fulfillment 1216 by providing a link to download the requested song. If the transaction request 1210 is for a physical product or service, then an indication may be provided to the user 1202 that the merchant will perform the requested transaction.

Figure 7:
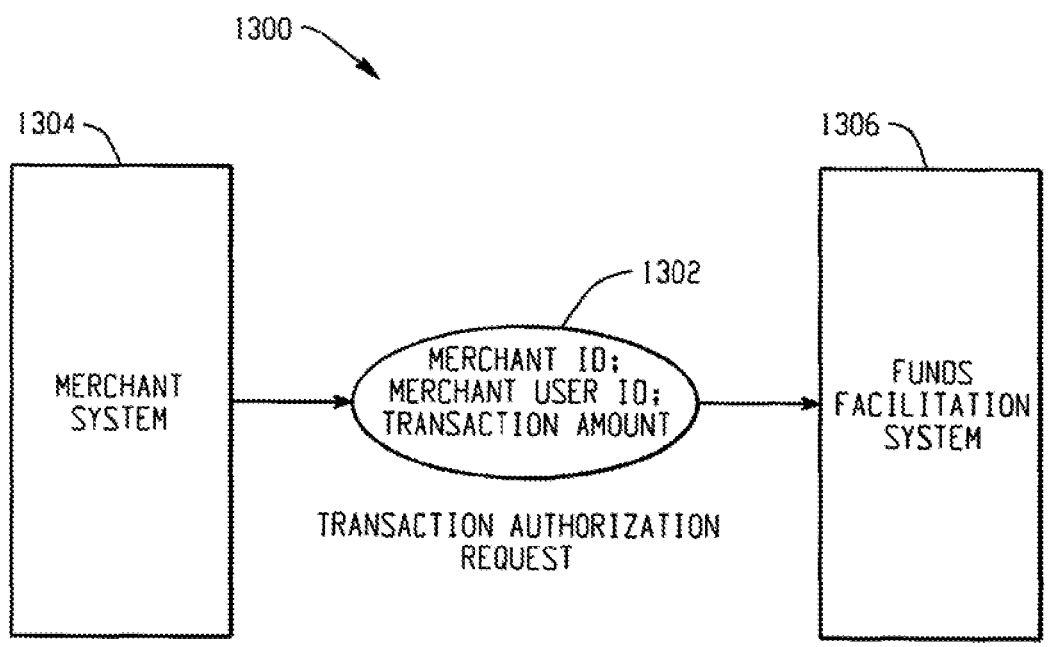
FIG. 7 is a block diagram depicting the contents of a transaction authorization request from a merchant system to a funds facilitation system.

FIG. 7 is a block diagram depicting the contents of a transaction authorization request 1302 from a merchant system 1304 to a funds facilitation system 1306. The transaction authorization request 1302 contains a merchant ID identifying the merchant associated with the merchant system 1304. The transaction authorization request also includes a merchant user ID that identifies the user associated with the pending request's account on the merchant system 1304. The transaction authorization request also includes a transaction cost or amount associated with the requested transaction. The transaction authorization request may include other data including a transaction ID for identifying the pending transaction in any transaction authorization or transaction denial received by the merchant system 1304 from the funds facilitation system 1306.

Figure 8:
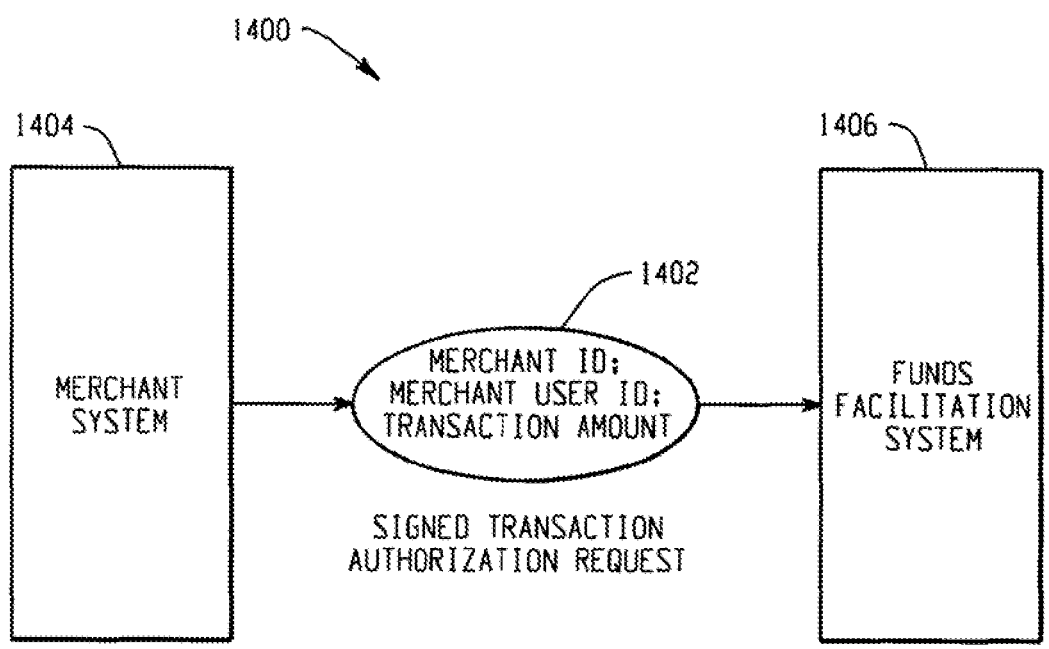
FIG. 8 is a block diagram depicting the contents of a signed transaction authorization request from a merchant system to a funds facilitation system.

FIG. 8 is a block diagram depicting the contents of a signed transaction authorization request 1402 from a merchant system 1404 to a funds facilitation system 1406. The transaction authorization request 1402 contains data that may include a merchant ID, a merchant user ID, and a transaction amount, as well as other data. A funds facilitation system 1406 may accept a merchant user authentication without any additional verification if the transaction authorization request 1402 is signed and from a trusted merchant. In this manner, the danger of fraudulent transactions is reduced while streamlining payment authorization via the trusted merchant's user authentication and the digital signature on the transaction authorization request.

Figure 9:
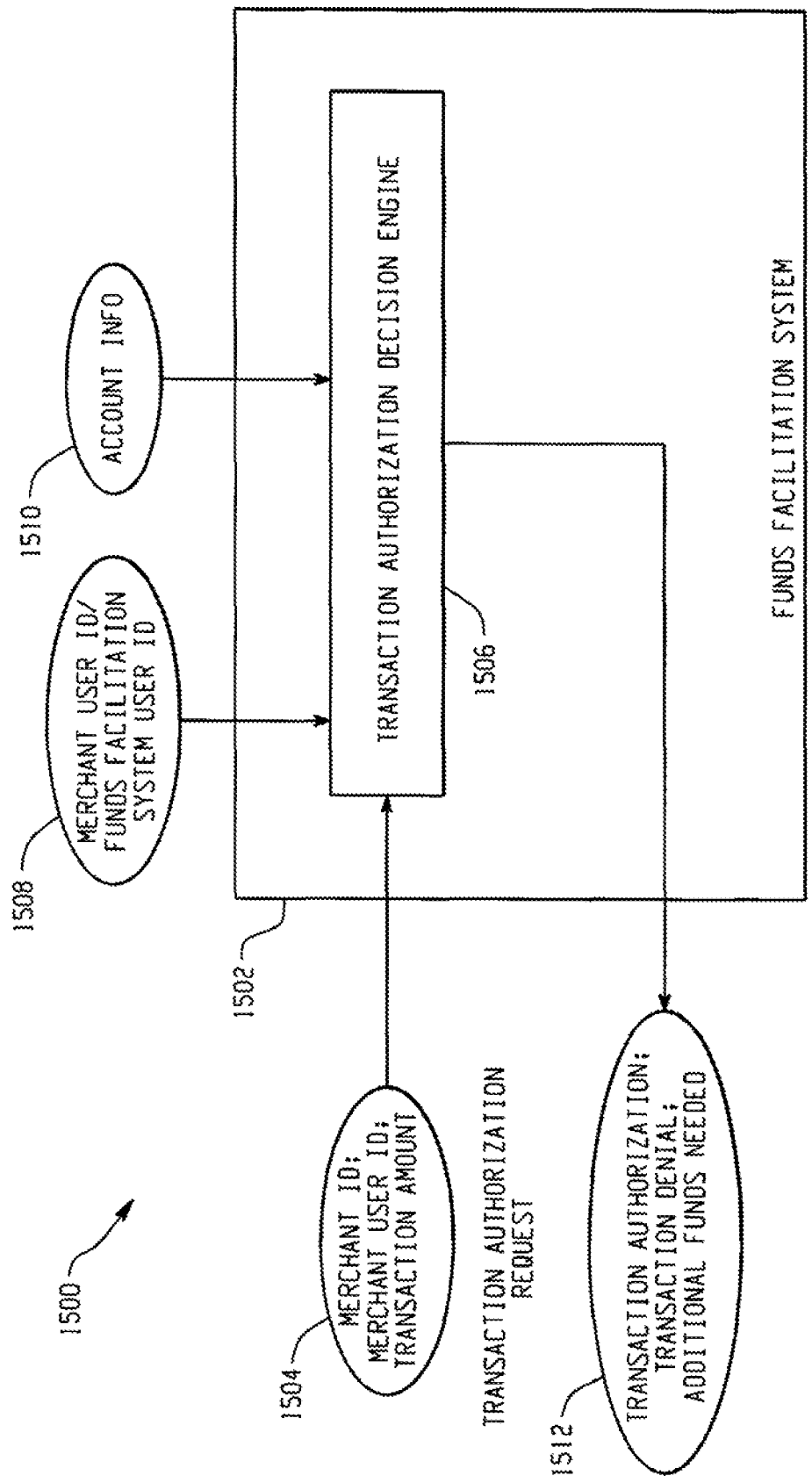
FIG. 9 is a block diagram depicting the generation of a transaction authorization, transaction denial, or additional funds needed message by a funds facilitation system.

FIG. 9 is a block diagram depicting the generation of a transaction authorization, transaction denial, or additional funds needed message by a funds facilitation system 1502. The funds facilitation system 1502 receives a transaction authorization request 1504 containing a merchant ID, a merchant user ID, and a transaction amount. The transaction authorization request 1504 is provided to a transaction authorization decision engine 1506 which accesses a data store 1508 to identify a funds facilitation system user ID associated with the merchant ID and merchant user ID provided in the transaction authorization request 1504. After identifying a funds facilitation system user ID for the user making the transaction request, the user's account info 1510 may be accessed. Based on the account info 1510 and the transaction amount recited in the transaction authorization request 1504, a transaction decision 1512 is rendered by the transaction authorization decision engine 1506 and output to the merchant system. For example, if the transaction amount is less than a high-value threshold and a stored value account identified in the user's account info 1510 contains sufficient funds to pay the transaction amount, then the transaction authorization decision engine 1506 will send a transaction authorization as the transaction decision 1512. The funds facilitation system 1502 may then execute a transfer of funds from the user's stored value account to an account associated with the merchant.

Figure 10:
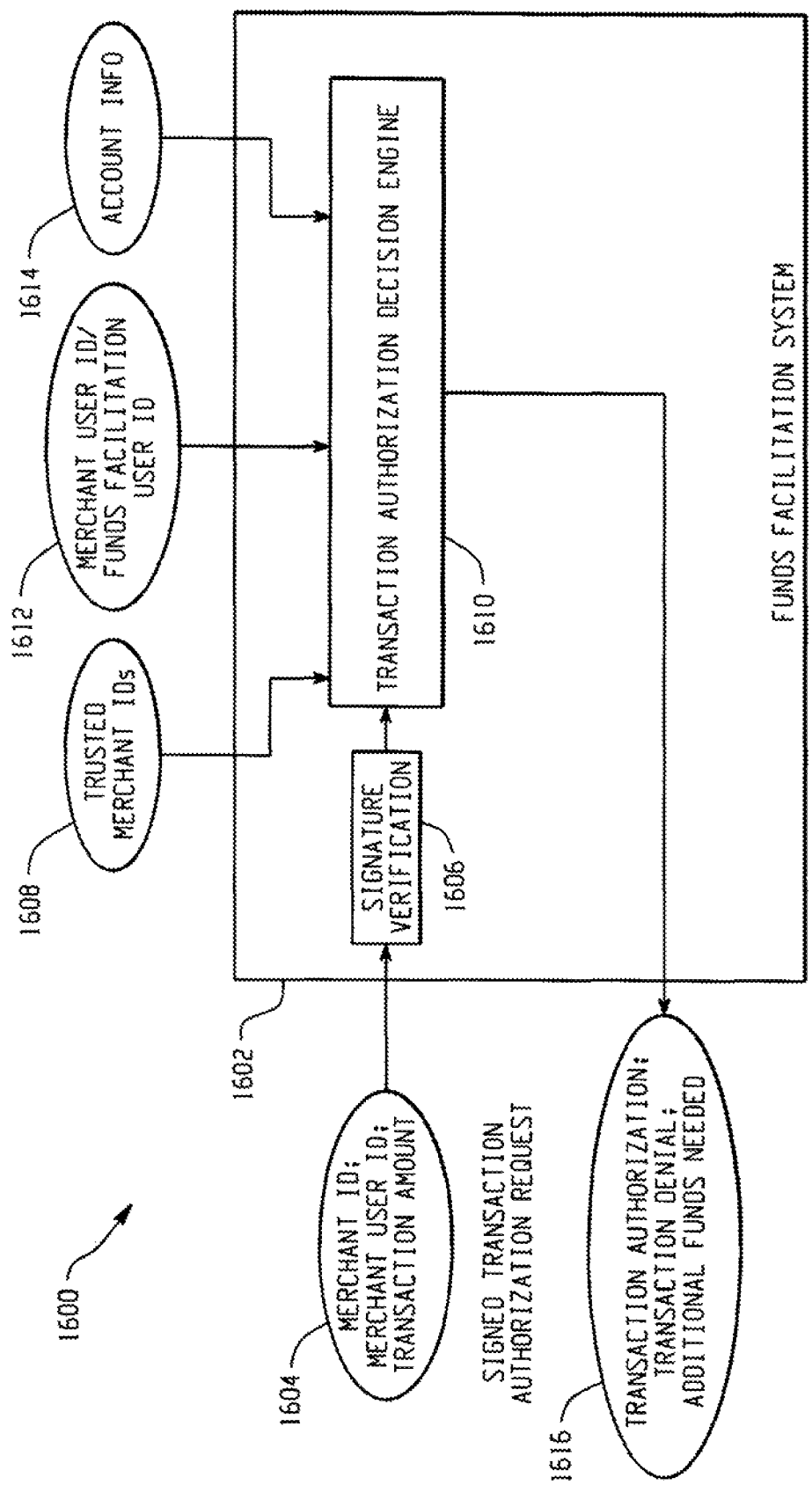
FIG. 10 is a block diagram depicting a funds facilitation system receiving a signed transaction authorization request.

FIG. 10 is a block diagram depicting a funds facilitation system 1602 receiving a signed transaction authorization request 1604. Upon receipt of a signed transaction authorization request 1604, the funds facilitation system 1602 may perform a signature verification operation 1606 on the received signed transaction authorization request 1604. Such a signature verification operation 1606 may include taking a hash of the signed transaction authorization request 1604 and comparing the calculated hash value with an encrypted value that is included with the signed transaction authorization request and decryptable using the sending merchant's public key. If the signature verification 1606 is successful and the merchant ID provided in the transaction authorization request 1604 matches a trusted merchant ID 1608, then the funds facilitation system 1602 may trust the user authorization mechanisms of the merchant system and require no further authentication of the user making the transaction request. If the merchant ID does not identify a trusted merchant, then the funds facilitation system may require that the user authenticate his funds facilitation system account by providing his funds facilitation system username and/or password or other authentication information. In one example, the funds facilitation system 1602 may perform the signature verification operation 1606 before opening the transaction authorization request 1604.

Following user authorization, the transaction authorization request 1604 is provided to a transaction authorization decision engine 1610 which accesses a data store 1612 to identify a funds facilitation system user ID associated with the merchant ID and merchant user ID provided in the transaction authorization request 1604. After identifying a funds facilitation system user ID for the user making the transaction request, the user's account info 1614 may be accessed. Based on the account info 1614 and the transaction amount recited in the transaction authorization request 1604, a transaction decision 1616 is rendered by the transaction authorization decision engine 1610 and output to the merchant system. For example, if the transaction amount is less than a high-value threshold and a stored value account identified in the account info 1614 contains insufficient funds to pay the transaction amount, then the transaction authorization decision engine 1610 may send a message (e.g., an additional funds needed message to the client or a transaction denied message to the merchant), as the transaction decision 1616. If the user provides authorization or information to make sufficient funds available, the transaction may still be approved, and the funds facilitation system 1602 may then execute the transfer of funds from the user's stored value account to an account associated with the merchant.

Figure 11:
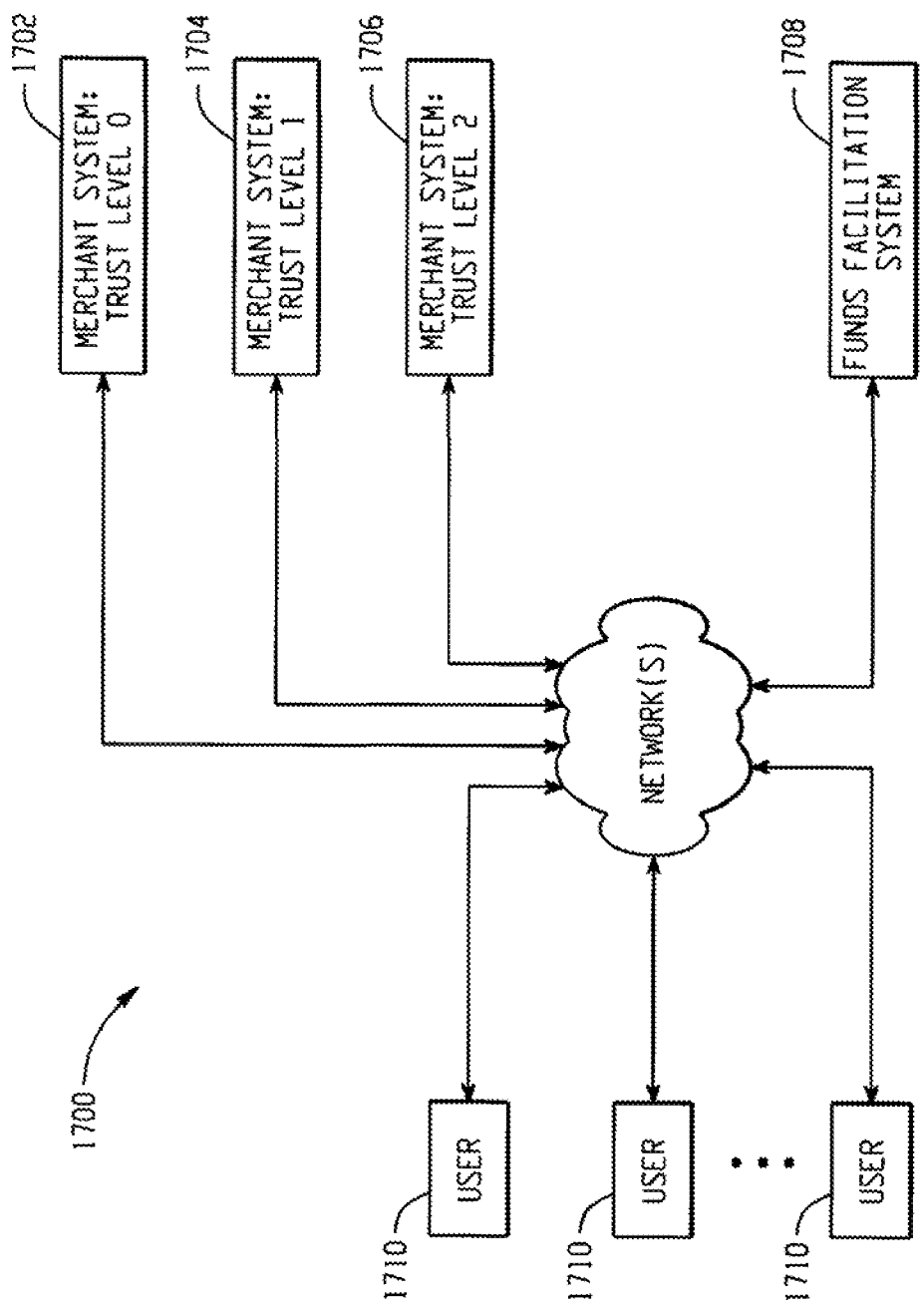
FIG. 11 is a block diagram illustrating three different trust level designations for merchant systems that may interface with a funds facilitation system.

FIG. 11 is a block diagram 1700 illustrating three different trust level designations for merchant systems 1702, 1704, 1706 that may interface with a funds facilitation system 1708. Specifically, a user 1710 may utilize the funds facilitation system 1708 to pay for transactions with three categories of merchant systems: a trust level 0 merchant, a trust level 1 merchant, or a trust level 2 merchant. A trust level 0 merchant, also referred to as a standard merchant, has no established trust designation with the funds facilitation system 1708, and therefore the user 1710 may be required to enter authentication information specific to an account with the funds facilitation system 1708, such as a user name and password, for every transaction with the merchant system 1702.

A trust level 1 merchant, also referred to as an express-session merchant, may enable a user 1710 to perform multiple transactions with the merchant system 1704 during a single session, while only entering funds facilitation system authentication information a single time during the session and without requiring any authentication directly with the merchant system. In such a session with a trust level 1 merchant, the merchant creates a temporary anonymous user ID for the user which is stored by the merchant system and provided to the funds facilitation system and is used in a token issued by the funds facilitation system to the merchant system and then provided by the merchant system to the funds facilitation system in subsequent transaction requests during the single session.

A trust level 2 merchant, also referred to as an express-seller merchant, may enable a user 1710 to perform multiple transactions with the merchant system 1706 during multiple sessions, while only entering funds facilitation system authentication system information a single time after first successfully authenticating themselves with the express seller merchant system authentication system. In such a session with a trust level 2 merchant, the merchant provides to the funds facilitation system the specific user ID which is associated with the user's authenticated profile on the merchant system and is used in a token issued by the funds facilitation system to the merchant system and then provided by the merchant system to the funds facilitation system in subsequent transaction requests during any future session with the merchant system where the user has first authenticated themselves to the merchant system.

Either an express-session or an express-seller relationship may be further secured, for example, by storing an identification cookie on the user's browser after the user successfully enters authentication information (e.g., a username and password) for the funds facilitation system. For instance, an express-session or express-seller link cookie may be generated by the funds facilitation system 1708 and stored on the user's browser upon successful authentication, and then the funds facilitation system 1708 may access the user's browser to verify the cookie for subsequent transactions with the express-session or express-seller merchant 1704, 1706.

Figure 12:
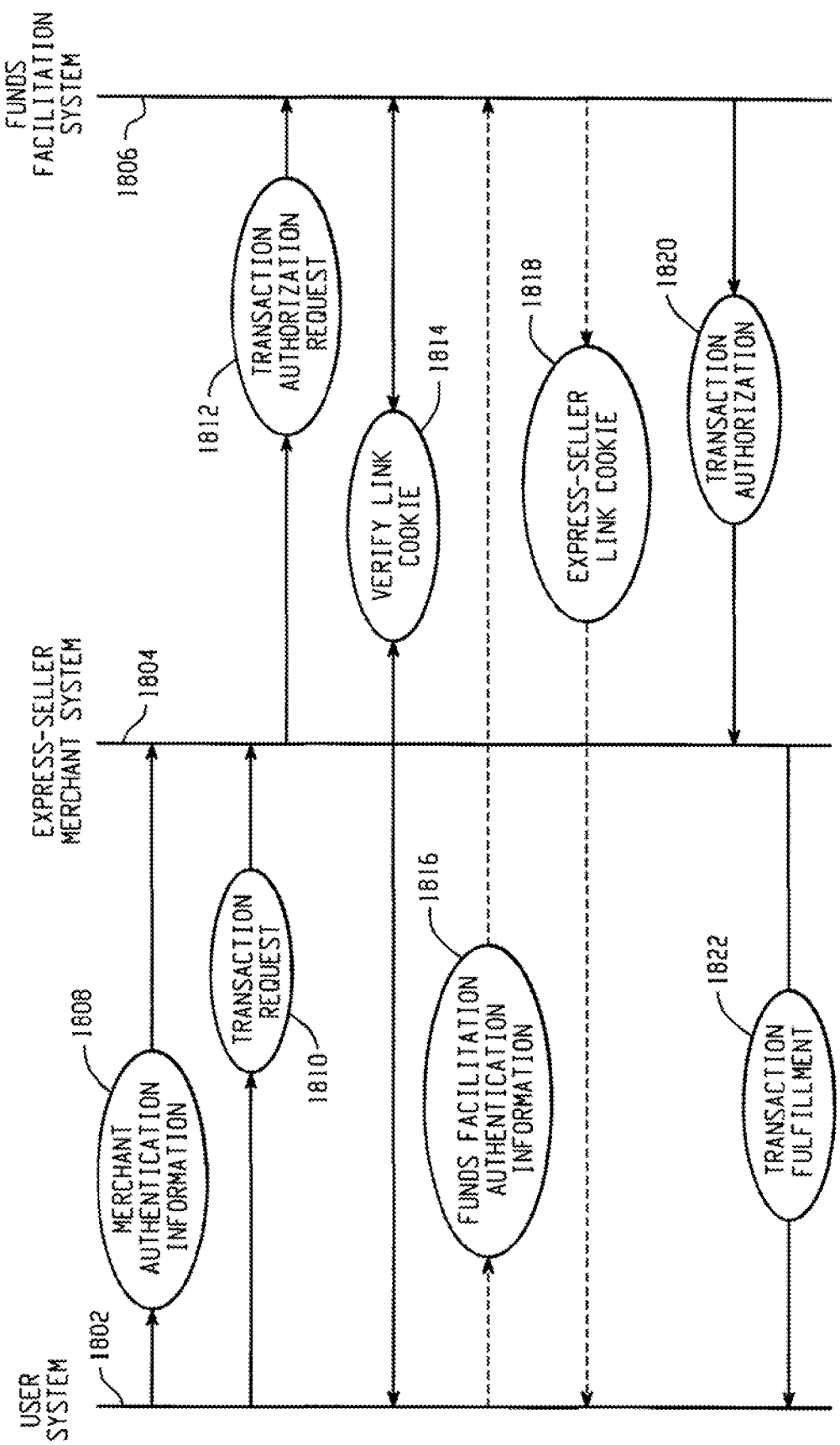
FIG. 12 is a diagram illustrating an example transaction procedure between a user system, an express seller merchant and a funds facilitation system.

FIG. 12 is a diagram 1800 illustrating an example transaction procedure between a user system 1802, an express seller merchant system 1804 and a funds facilitation system 1806. The user 1802 logs into the express-seller merchant system 1804 by providing merchant authentication information 1808, such as a merchant system username and password. The user 1802 logging into the express-seller merchant system 1804 enables the express-seller merchant system 1804 to associate a merchant user ID to the user 1802 for tracking user activity. After having logged into the express-seller merchant system 1804, the user may transmit a transaction request 1810 to the express-seller merchant system 1804. (In some configurations, the user 1802 may be prompted to supply merchant authentication information 1806 after the user 1802 has transmitted a transaction request 1808.)

Upon receipt of the transaction request 1810 from the user 1802, the express-seller merchant system sends a transaction authorization request 1812 to the funds facilitation system 1806 to determine whether the merchant should provide the transaction identified in the transaction request 1810. The transaction authorization request 1812 may include a merchant ID that identifies the merchant associated with the express-seller merchant system 1804, a merchant user ID that identifies the user 1802 of the express-seller merchant system 1804 and a cost or transaction amount associated with the transaction that the user has requested. The transaction authorization request 1812 may further include a transaction description, a merchant transaction ID, a date/time that the transaction request 1810 was received, a date/time that the transaction authorization request was generated, a redirection URL for redirecting a user interface following the transaction, as well as other data. In addition, the transaction authorization request 1812 may be signed by the express-seller merchant system 1804 to authenticate the source of the request 1812 to the funds facilitation system 1806.

Upon receipt of a transaction authorization request 1812, the funds facilitation system 1806 may determine a funds facilitation system user ID based on the merchant ID and merchant user ID included in the transaction authorization request. The funds facilitation system 1806 may be informed of this association between merchant accounts and funds facilitation system user accounts via a user linking the accounts, as will be discussed in further detail with respect to FIG. 15, herein. In addition, after receipt of the transaction authorization request 1812, the funds facilitation system 1806 may access the user system 1802 to determine if a valid express-seller link cookie is stored on the user system 1802. As explained above, an express seller link cookie may be stored in the user system 1802 to allow multiple transactions by the user 1802 with the merchant system 806 during multiple sessions, while only entering funds facilitation system authentication system information a single time, but entering merchant system authentication system information at the outset of each of the multiple sessions. For security, an express seller link cookie may also be encrypted.

If no express seller link cookie is identified on the user system 1802, or if the identified link cookie is not valid, then the user 1802 may be required to provide funds facilitation authentication information 1816 to the funds facilitation system 1806 for further authentication of the user's account with the funds facilitation system 1806. For example, an express seller link cookie, although valid for multiple sessions, may become invalid after a pre-determined time period or for other reasons. In addition, if no link cookie is identified or if the identified link cookie is no longer valid, the funds facilitation system 1806 may, upon successful authentication 1816, generate a new express seller link cookie 1818 and store the link cookie on the user system 1802.

Upon identification and validation of the user 1802 by the funds facilitation system 1806, the funds facilitation system 1806 makes a determination as to whether the requested transaction should be authorized. For example, if a default payment account associated with the user's funds facilitation system account contains insufficient funds, then the transaction may be denied, or the merchant system 1804 may be instructed to provide a graphical user interface to the user 1802 to identify an additional funding source or to refill the stored value account. The funds facilitation system 1806 communicates the authorization decision to the express-seller merchant system 1804 via a transaction authorization 1820. The transaction authorization 1820 may contain the merchant user ID for the user 1802, a transaction identifier value, a transaction authorization message, as well as other data.

Upon receipt of a transaction authorization 1820 from the funds facilitation system 1806, the merchant system may then fulfill the transaction as appropriate.

Figure 13:
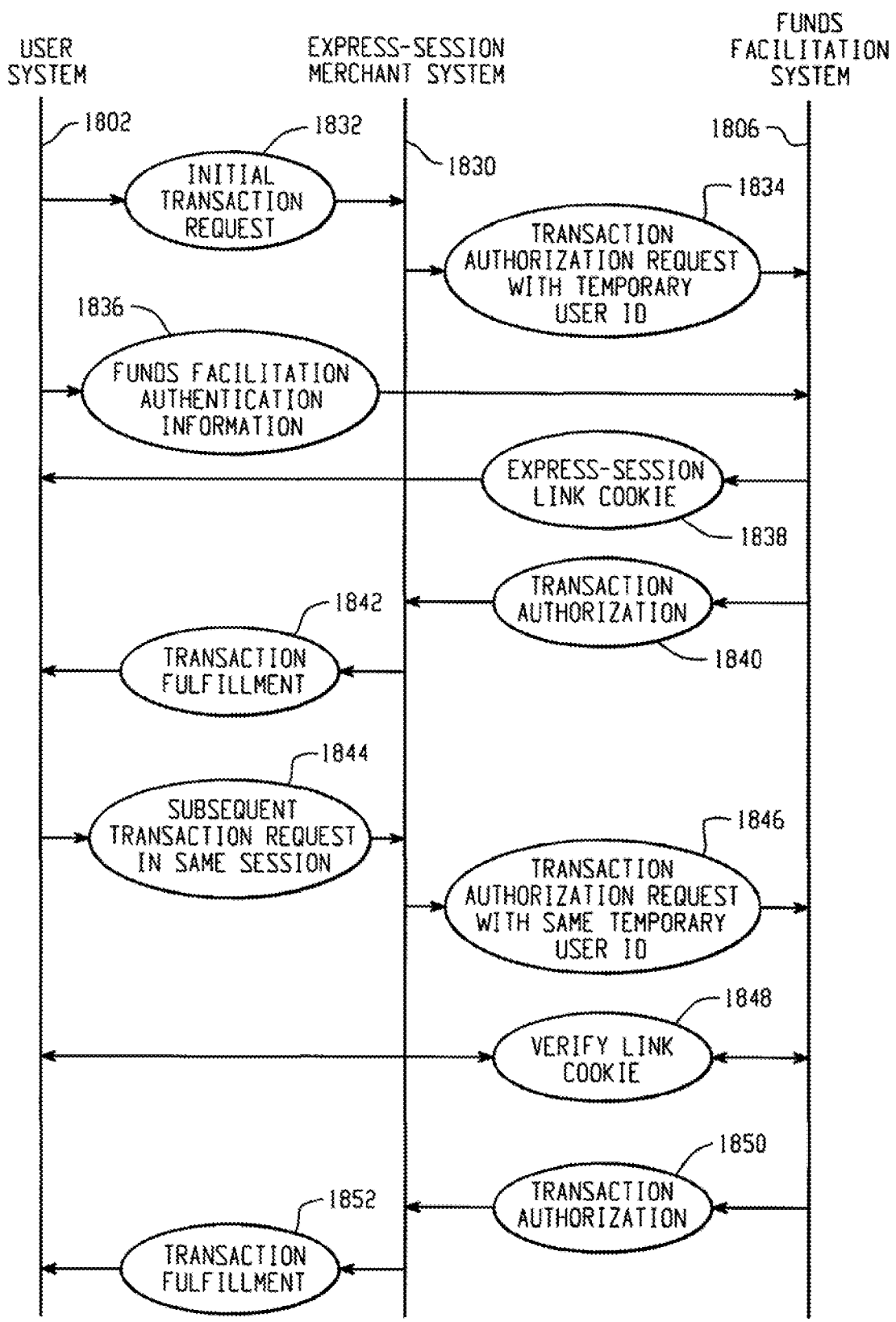
FIG. 13 is a diagram illustrating an example transaction procedure between a user system, an express-session merchant and a funds facilitation system.

FIG. 13 is a diagram illustrating an example transaction procedure between a user system 1802, an express-session merchant system 1830 and a funds facilitation system 1806. The diagram illustrated in FIG. 13 shows transactions made during a single session between the user system 1802 and the express-session merchant system 1830. An initial transaction request during the session is shown at reference 1832.

As explained above, the transaction request 1832 may be made in an anonymous session with the express-session merchant system 1830 because direct authentication with the express-session merchant 1830 is not required.

Upon receipt of the initial transaction request 1832 from the user 1802, the express-session merchant system 1806 creates a temporary anonymous user ID for the session, and sends a transaction authorization request 1834 along with the temporary user ID to the funds facilitation system 1806 to determine whether the merchant should provide the transaction identified in the transaction request 1832. The transaction authorization request 1832 may include a merchant ID that identifies the merchant associated with the express-session merchant system 1830, the temporary anonymous user ID, and a cost or transaction amount associated with the transaction that the user has requested. The transaction authorization request 1832 may further include a transaction description, a merchant transaction ID, a date/time that the transaction request 1832 was received, a date/time that the transaction authorization request was generated, a redirection URL for redirecting a user interface following the transaction, as well as other data. In addition, the transaction authorization request 1834 may be signed by the express-session merchant system 1830 to authenticate the source of the request 1834 to the funds facilitation system 1806.

Upon receipt of an initial transaction authorization request 1834, the funds facilitation system 1806 may require the user 1802 to provide funds facilitation authentication information 1836 to the funds facilitation system 1806 to authenticate the user's account with the funds facilitation system 1806. Upon identification and validation of the user 1802 by the funds facilitation system 1806, the funds facilitation system 1806 generates an express-session link cookie 1838 and causes the cookie 1838 to be stored at the user system 1802. The express-session link cookie 1838 is only valid for the duration of a single session between the user system 1802 and the merchant system 1830, and enables multiple transactions by the user 1802 with the express-session merchant system 1830 during a single session, while only entering funds facilitation system authentication information 1836 a single time during the session. For security, an express-session link cookie 1838 may also be encrypted.

After successful identification and validation, the funds facilitation system 1806 makes a determination as to whether the requested transaction should be authorized. For example, if a default payment account associated with the user's funds facilitation system account contains insufficient funds, then the transaction may be denied, or the merchant system 1830 may be instructed to provide a graphical user interface to the user 1802 to identify an additional funding source or to refill the stored value account. The funds facilitation system 1806 communicates the authorization decision to the express-session merchant system 1830 via a transaction authorization 1840. The transaction authorization 1840 may contain the merchant user ID for the user 1802, a transaction identifier value, a transaction authorization message, as well as other data. Upon receipt of a transaction authorization 1840 from the funds facilitation system 1806, the merchant system 1830 may then fulfill the transaction as appropriate, as shown at reference 1842.

At reference 1844, a subsequent transaction request is submitted by the user 1802 to the merchant 1830 during the same session. Upon receipt of the subsequent transaction request 1844 from the user 1802, the express-session merchant system 1830 sends a transaction authorization request 1846 along with the temporary user ID created for the session to the funds facilitation system 1806 to determine whether the merchant should provide the transaction identified in the transaction request 1844. The funds facilitation system 1806 may then access the user system 1802 to determine if a valid express-session link cookie is stored on the user system 1802.

Upon successful identification of a valid express-session link cookie 1838, the funds facilitation system 1806 makes a determination as to whether the subsequent requested transaction should be authorized, for example based on whether the user's account contains sufficient funds. The funds facilitation system 1806 communicates the authorization decision to the express-session merchant system 1830 via a transaction authorization 1850, and the merchant system 1830 may then fulfill the subsequent transaction as appropriate, as shown at reference 1852.

Figure 14:
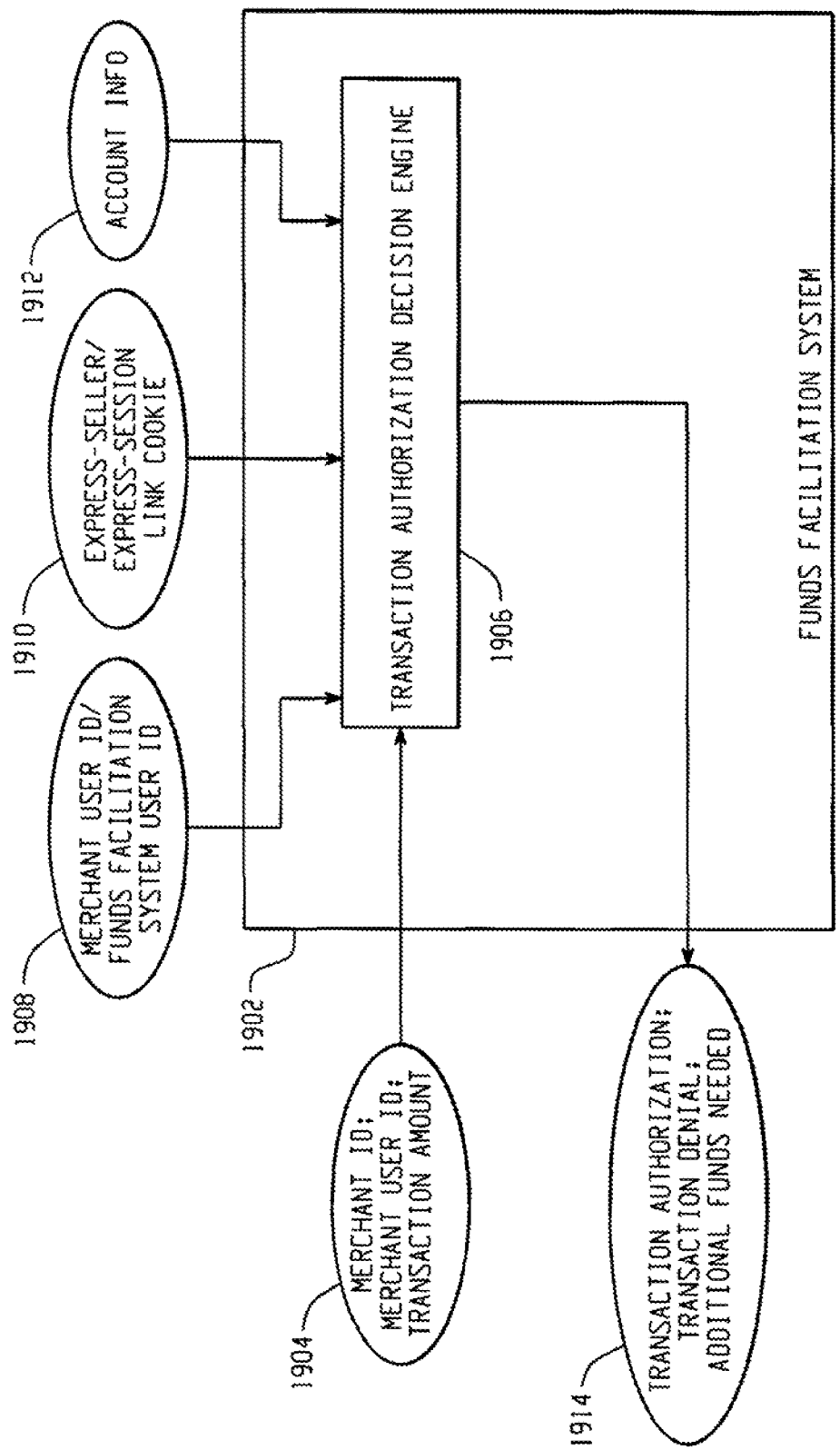
FIG. 14 is another example block diagram depicting the generation of a transaction authorization, transaction denial, or additional funds needed message by a funds facilitation system.

FIG. 14 is another example block diagram depicting the generation of a transaction authorization, transaction denial, or additional funds needed message by a funds facilitation system 1902. The funds facilitation system 1902 receives a transaction authorization request 1904 containing a merchant ID, a merchant user ID, and a transaction amount. The transaction authorization request 1904 is provided to a transaction authorization decision engine 1906 which accesses a data store 1908 to identify a funds facilitation system user ID associated with the merchant ID and merchant user ID provided in the transaction authorization request 1904. In addition, the transaction authorization decision engine 1906 may access the user's browser to identify a valid express-seller or express-session link cookie 1910. If no valid link cookie 1910 is identified (e.g., the link cookie does not exist or is expired), then the transaction authorization decision engine 1906 may require additional authentication information from the user, which may also be verified against information in the data store 1908.

After identifying a funds facilitation system user ID and authenticating the user, the user's account info 1912 may be accessed. Based on the account info 1912 and the transaction amount recited in the transaction authorization request 1904, a transaction decision 1914 is rendered by the transaction authorization decision engine 1906 and output to the merchant system. For example, if the transaction amount is less than a high-value threshold and a stored value account identified in the user's account info 1912 contains sufficient funds to pay the transaction amount, then the transaction authorization decision engine 1906 will send a transaction authorization as the transaction decision 1914. The funds facilitation system 1902 may then execute a transfer of funds from the user's stored value account to an account associated with the merchant.

FIG. 15 is a screenshot depicting at 2000 an example user interface for linking a merchant account to a funds facilitation system account. The user interface 2000 is displayed upon an attempt to purchase "Songs for Children" from the merchant website "Music Website." As shown at 2002, the user "Jeff Perlman" is logged into the funds facilitation system. Prior to linking the user's merchant account to the user's funds facilitation system account, the user must identify their funds facilitation account and authenticate himself to the funds facilitation system via a password input shown at 2004 to make a purchase. By authorizing a linkage between the user's merchant account for a trust level 2 merchant ("Express Seller") and funds facilitation system account via the input at 2006, an express-seller link cookie will be issued to the user's browser and the user will be relieved of the requirement to authenticate himself to the funds facilitation system over and above the authentication required by the merchant system so long as the express-seller link cookie is present. This linkage may be made during the course of a purchase, as shown in FIG. 15, or at another time via an interface provided by the merchant system, or via an interface provided by the funds facilitation system. The authorized linkage may be stored in a data store at the merchant system and/or at the funds facilitation system as shown in FIG. 14 as well as in the form of an encrypted express-seller link cookie on the user's browser.

Figure 16:
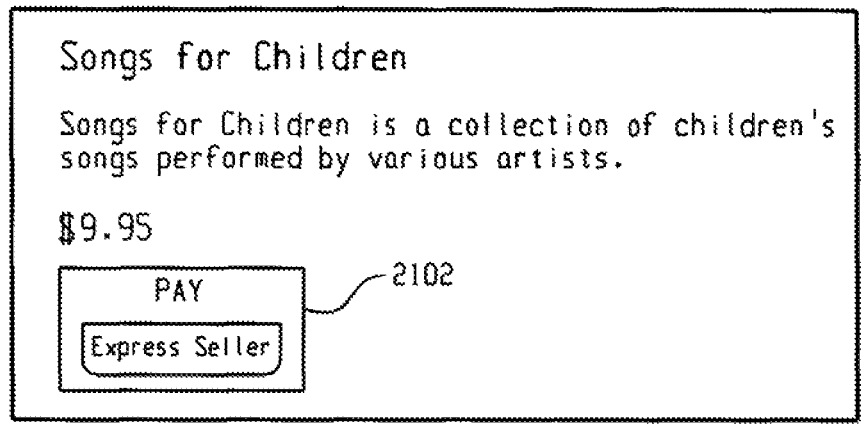
FIG. 16 depicts an example user interface providing keyboardless purchasing availability to a user logged into a trusted merchant's website.

FIG. 16 depicts an example user interface providing a keyboardless purchasing ability to a user logged into a trusted merchant's website. Because the user has provided sufficient authorization information for authentication at a trust level 2 (express-seller) merchant, the funds facilitation system requires no additional authentication for a user to make certain or purchases. (The system may still require further user authentication for purchases at or above a high-value threshold or if it cannot find an express-seller link cookie on the user's browser confirming this authorization.) Because no additional user authentication is necessary, the user may make the purchase via a single click of an interface button 2102. In response to such a click, the merchant system will send a transaction authorization request to the funds facilitation system. The funds facilitation system will verify that sufficient funds are available in or accessible from at least one designated user account. If funds are available, an approval message will be returned to the merchant system and the funds may be transferred from a user account to the merchant's account. Upon receipt of an approval message from the funds facilitation system, the merchant may then automatically or manually fulfill the transaction requested by the user.

FIG. 17 is a screenshot depicting an example user interface 2200 for creating an express-session link between a merchant account and a funds facilitation system account. As shown at 2202, the user "Jeff Perlman" is logged into the funds facilitation system. Prior to linking the user's merchant session to the user's funds facilitation system account, the user must identify his funds facilitation account and authenticate himself to the funds facilitation system via a password input shown at 2204 to make a purchase. By authorizing a session linkage between the user's merchant session for a trust level 1 merchant ("Express Session") and funds facilitation system account via the input at 2206, an express-session link cookie will be issued to the user's browser and the user will be relieved of the requirement to authenticate himself to the funds facilitation system for the duration of the session with the merchant website so long as the express-session link cookie is present. The authorized linkage may be stored in a data store at the merchant system and/or at the funds facilitation system as shown in FIG. 14 as well as in the form of an encrypted express-session link cookie on the user's browser.

Figure 18:
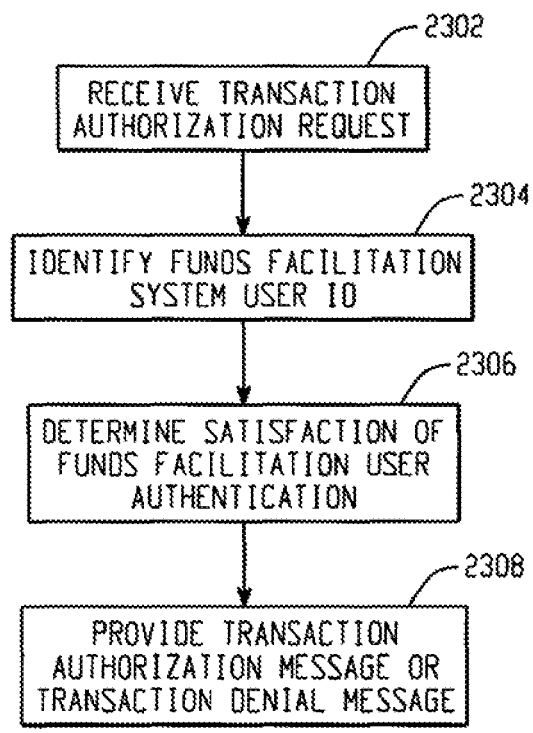
FIG. 18 is a flow diagram depicting a computer implemented method of providing a transaction authorization for a transaction requested by a user to a merchant system.

FIG. 18 is a flow diagram depicting a computer implemented method of providing a transaction authorization for a transaction requested by a user to a merchant system, where the transaction authorization is provided from a funds facilitation system that requires a funds facilitation user authentication, where the transaction authorization is provided to a trusted merchant system without requiring user input of any funds facilitation user authentication information in excess of merchant authentication information required by the merchant system. The method includes receiving a transaction authorization request from the merchant system, where the transaction authorization request contains a merchant ID, a merchant user ID, and a transaction amount, as shown at 2302. At 2304, a funds facilitation system user ID is identified based on the merchant ID and the merchant user ID, and at 2306, satisfaction of the funds facilitation user authentication is determined based on the merchant system associated with the merchant ID having a trusted status with the funds facilitation system and the existence of a funds facilitation system user ID that is associated with both the merchant ID and the merchant user ID. In addition, at 2306, satisfaction of the funds facilitation user authentication may be further based on the funds facilitation system accessing the user's browser, as described above, to verify the existence of a valid express-session or express-seller link cookie. At 2308, a transaction authorization message or a transaction denial message is provided to the merchant system based on the account information associated with the funds facilitation system user ID and the transaction amount.

Figure 19:
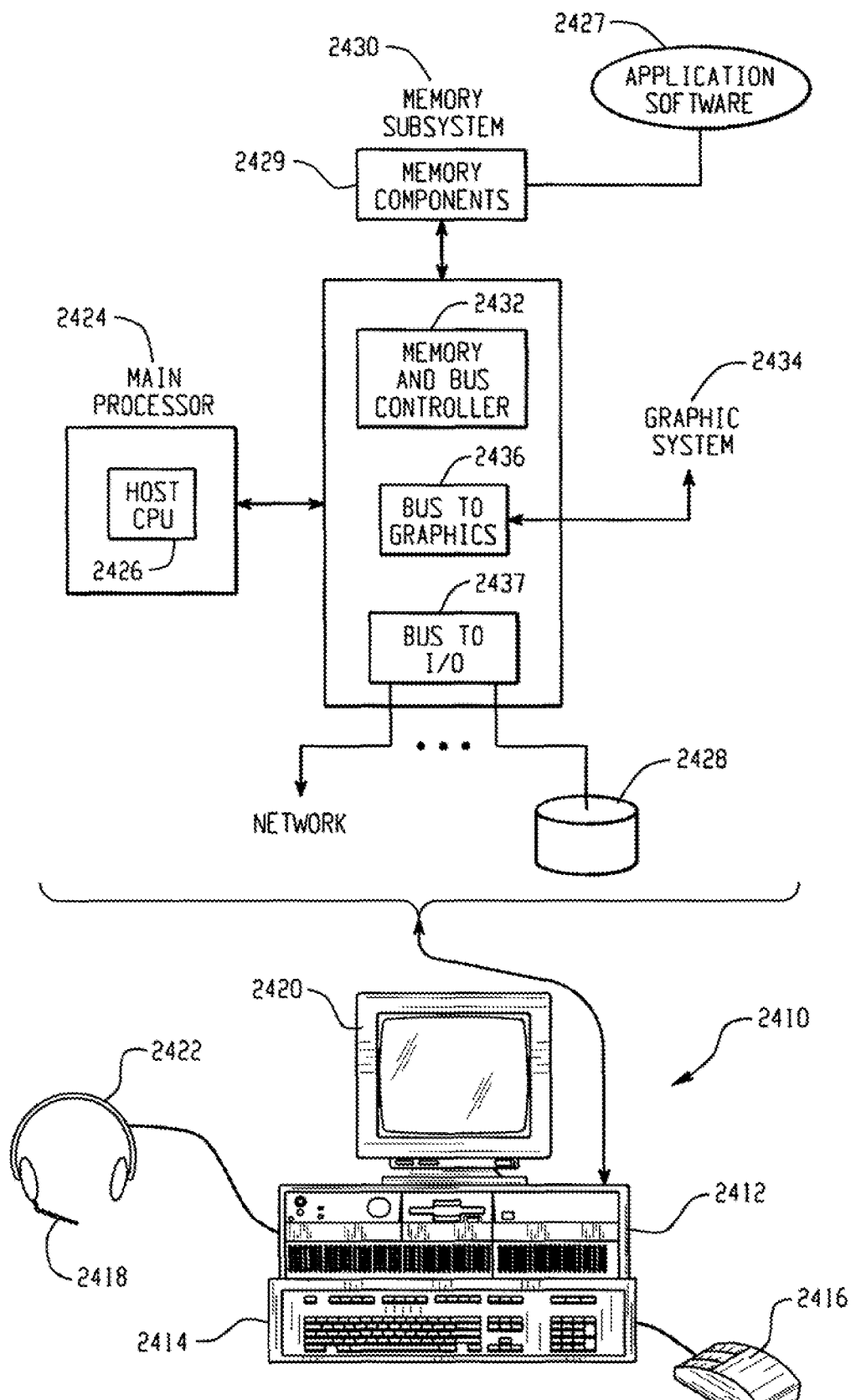
FIG. 19 is a block diagram of hardware which may be used to implement the various embodiments of the method of the present invention including in a user computer, the merchant system, the funds facilitation system, and other computers involved in the system.

FIG. 19 is a block diagram of hardware 2410 which may be used to implement the various embodiments of the method of the present invention including in a user computer, the merchant system, the funds facilitation system, and other computers involved in the system. The hardware 2410 may be a personal computer system or server system that includes a computer 2412 having as input devices keyboard 2414, mouse 2416, and microphone 2418. Output devices such as a monitor 2420 and speakers 2422 may also be provided. The reader will recognize that other types of input and output devices may be provided and that the present invention is not limited by the particular hardware configuration.

Residing within computer system 2412 is a main processor 2424 which is comprised of a host central processing unit 2426 (CPU). Software applications 2427, such as the method of the present invention, may be loaded from, for example, disk 2428 (or other device), into main memory 2429 from which the software application 2427 may be run on the host CPU 2426. One or more processor 2424 operates in conjunction with a memory subsystem 2430. The memory subsystem 2430 is comprised of the main memory 2429, which may be comprised of a number of memory components, and a memory and bus controller 2432 which operates to control access to the main memory 2429. The main memory 2429 and controller 2432 may be in communication with a graphics system 2434 through a bus 2436. Other buses may exist, such as a PCI bus 2437, which interfaces to I/O devices or storage devices, such as disk 2428 or a CDROM, or to provide network access.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter generating a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   storing, by a computer-implemented funds facilitation system, a trust level for a merchant system associated with a merchant;
   receiving, by the funds facilitation system, a transaction authorization request from the merchant system, the transaction authorization request including:
   a request to charge a transaction amount of a transaction to an account of a user,
   a merchant identifier identifying the merchant system, and
   a user identifier identifying the user;
   based on the merchant identifier, determining, by the funds facilitation system, the stored trust level for the merchant system;
   in response to receiving the transaction authorization request and the determination of the stored trust level for the merchant system, determining that an express seller link cookie is stored on a user system associated with the user; and
   based on the stored trust level for the merchant system and the determination that the express seller link cookie is stored on the user system, automatically transmitting, by the funds facilitation system to the merchant system, approval of the transaction authorization request to the merchant system without receiving additional authentication information from the user.

2. The method of claim 1, wherein the stored trust level for the merchant system is one of at least a first trust level or a second trust level, and wherein the transmitting approval of the transaction authorization request without receiving additional authentication information from the user only takes place when the stored trust level for the merchant is the second trust level.

3. The method of claim 1, further comprising receiving a user selection of the trust level for the merchant system.

4. The method of claim 1, further comprising:
   upon receiving the trust level for the merchant system, automatically generating, by the funds facilitation system, the express link cookie including indicating authorization of transactions between the funds facilitation system and merchant systems having the stored trust level; and
   transmitting the express link cookie to the user system of the user, wherein the express link cookie is configured to be subsequently detectable on the user system by the funds facilitation system.

5. The method of claim 4, further comprising:
   based on the determination of the presence of the express link cookie on the user system, determining, by the funds facilitation system, that further authentication is not required from the user.

6. The method of claim 5, wherein the express link cookie includes information to confirm the user's authorization to categorize the merchant system as having a trust level that corresponds to not requiring receipt of the user authentication by the funds facilitation system.

7. The method of claim 5, further comprising verifying that the express link cookie stored on the user system is valid, and wherein the determining of not requiring the authentication information is based on the validity of the express link cookie.

8. The method of claim 5, wherein the express link cookie remains valid for a plurality of web sessions between the user system and the merchant system.

9. The method of claim 1, wherein the transaction authorization request includes a digital signature associated with the merchant system, the method further comprising verifying authenticity of the digital signature, wherein the transmitting of the approval of the transaction authorization request by the funds facilitation system without the authentication information from the user is contingent upon successfully verifying the authenticity of the digital signature.

10. A computer-implemented funds facilitation system comprising:
  a processor; and
  a computer readable non-transitory storage medium containing instructions which, when executed on the processor, cause the processor to:
    store a trust level for a merchant system associated with a merchant;
    receive a transaction authorization request from the merchant system, the transaction authorization request including:
      a request to charge a transaction amount of a transaction to an account of a user,
      a merchant identifier identifying the merchant system, and
      a user identifier identifying the user;
    based on the merchant identifier, determine the stored trust level for the merchant system;
    in response to receiving the transaction authorization request and the determination of the stored trust level for the merchant system, determine that an express seller link cookie is stored on a user system associated with the user; and
    based on the stored trust level for the merchant system and the determination that the express seller link cookie is stored on the user system, automatically transmit, to the merchant system, approval of the transaction authorization request without receiving additional authentication information from the user.

11. The computer-implemented funds facilitation system of claim 10, wherein the stored trust level for the merchant system is one of at least a first trust level or a second trust level, and wherein the transmitting approval of the transaction authorization request without receiving additional authentication information from the user only takes place when the stored trust level for the merchant is the second trust level.

12. The computer-implemented funds facilitation system of claim 10, the instructions further causing the processor to receive a user selection of the trust level for the merchant system.

13. The computer-implemented funds facilitation system of claim 10, the instructions further causing the processor to:
  upon receiving the trust level for the merchant system, automatically generate, by the funds facilitation system, the express link cookie including indicating authorization of transactions between the funds facilitation system and merchant systems having the stored trust level; and
  transmit the express link cookie to the user system of the user, wherein the express link cookie is configured to be subsequently detectable on the user system by the funds facilitation system.

14. The computer-implemented funds facilitation system of claim 13, the instructions further causing the processor to:
  based on the determination of the presence of the express link cookie on the user system, determine, by the funds facilitation system, that further authentication is not required from the user.

15. The computer-implemented funds facilitation system of claim 14, wherein the express link cookie includes information to confirm the user's authorization to categorize the merchant system as having a trust level that corresponds to not requiring receipt of the user authentication by the funds facilitation system.

16. The computer-implemented funds facilitation system of claim 14, the instructions further causing the processor to verify that the express link cookie stored on the user system is valid, and wherein the determining of not requiring the authentication information is based on the validity of the express link cookie.

17. The computer-implemented funds facilitation system of claim 14, wherein the express link cookie remains valid for a plurality of web sessions between the user system and the merchant system.

18. A computer-implemented funds facilitation system comprising:
  a processor; and
  a computer readable non-transitory storage medium containing instructions which, when executed on the processor, cause the processor to:
    receive a trust level selection for a merchant system from a user of the funds facilitation system;
    store the trust level for the merchant system, the trust level being associated with a user identifier identifying the user;
    receive a transaction authorization request from the merchant system, the transaction authorization request including:
      a request to charge a transaction amount of a transaction to an account of the user,
      a merchant identifier identifying the merchant system, and
      the user identifier identifying the user;
    based on the merchant identifier, determine the stored trust level for the merchant system;
    in response to receiving the transaction authorization request and the determination of the stored trust level for the merchant system, determine that an express seller link cookie is not stored on a user system associated with the user;
    based on the determination that the express seller link cookie is not identified on the user system, automatically transmit a request to the user for further authorization information;
    receive the further authorization information from the user;
    determine that the further authorization information from the user is valid; and
    based on the determination that the further authorization information from the user is valid, transmit, to the merchant system, approval of the transaction authorization request.

* * * * *